United States Patent [19]
DeGrow et al.

[11] Patent Number: 5,285,051
[45] Date of Patent: Feb. 8, 1994

[54] RETHERMALIZATION SYSTEM INCLUDING FOOD SERVICE DISH

[75] Inventors: Gary DeGrow, Antioch; Julia T. Wimpee, Smyrna; Kevin B. Cundiff, Brentwood, all of Tenn.; Royce A. Payton, Oakland, Mo.; Roger W. Pepper, Whitehouse, Tenn.; Leonard L. Mitchum, Jr., Huntsville, Ala.; Robert A. McCoy, Franklin, Tenn.

[73] Assignee: Aladdin Synergetics, Inc., Nashville, Tenn.

[21] Appl. No.: 794,630

[22] Filed: Nov. 18, 1991

Related U.S. Application Data

[60] Continuation of Ser. No. 471,483, Jan. 29, 1990, which is a division of Ser. No. 394,204, Aug. 15, 1989, abandoned.

[51] Int. Cl.$^5$ ............................................. A47J 39/00
[52] U.S. Cl. .................................... 219/386; 165/919
[58] Field of Search ...................... 219/386, 521, 432; 165/918, 919; 312/236; 206/562, 563, 565

[56] References Cited

U.S. PATENT DOCUMENTS

| Re. 30,623 | 5/1981 | Schulz . | |
|---|---|---|---|
| Re. 30,962 | 6/1982 | Bridges | 220/23.6 |
| 2,028,649 | 1/1936 | Conroy | 99/422 X |
| 2,210,521 | 8/1940 | Bemis | 99/448 X |
| 2,222,065 | 11/1940 | Blakeslee . | |

(List continued on next page.)

FOREIGN PATENT DOCUMENTS

| 0024992 | 3/1981 | European Pat. Off. . |
|---|---|---|
| 1219352 | 5/1960 | France . |
| 2285836 | 4/1976 | France . |
| 2066594 | 7/1981 | United Kingdom . |

OTHER PUBLICATIONS

Aladdin Advanced Meal Systems Brochure, 1987 (month unknown).

(List continued on next page.)

*Primary Examiner*—Bruce A. Reynolds
*Assistant Examiner*—John A. Jeffery
*Attorney, Agent, or Firm*—Banner, Birch, McKie & Beckett

[57] ABSTRACT

A rethermalization system for rethermalizing food includes (a) a food service tray having a hot dish through-opening and the through-opening having a through-opening top edge, (b) a rethermalization cart including a cart frame, a plurality of heating pads supported within the cart frame, and a plurality of vertically spaced tray supports attached to the cart frame for supporting the food service tray at a plurality of alternative vertically spaced shelf locations, and in a tray support position such that the hot dish through-opening is disposed above one of the heating pads, and (c) a food service dish positionable in the hot dish through-opening of the food service tray. The food service dish has a bottom surface for allowing heat transfer to occur from the heating pad to food in the food service dish with the tray in the tray support position, The food service dish is positionable in a heating position when the tray is in the tray support position such that the bottom surface of the food service dish is supported by the heating pad and an upper lip of the food service dish is slightly raised and out of contact with hot dish through-opening edge. This prevents heat transfer between the food service dish and the food service tray during heating of the food. The food service dish is also positionable in a serving position when the tray is supported on a planar surface such that the food service dish is supported by the contact of the upper lip with the hot dish through-opening top edge. This causes the generally vertical wall to be closely positioned adjacent to the hot dish through-opening in order to prevent excessive movement of the food service dish within the through-opening while the rethermalized food in the food service dish is being consumed.

23 Claims, 15 Drawing Sheets

U.S. PATENT DOCUMENTS

| | | | |
|---|---|---|---|
| 2,330,867 | 10/1943 | Challet. | |
| 2,668,222 | 2/1954 | McCormick. | |
| 2,906,412 | 9/1959 | Tanner | D7/553 X |
| 3,140,389 | 7/1964 | Windes. | |
| 3,270,660 | 9/1966 | Filipak. | |
| 3,470,944 | 10/1969 | Segal | 126/246 X |
| 3,608,770 | 9/1971 | Naimoli. | |
| 3,725,645 | 4/1973 | Shevlin | 219/432 |
| 3,750,083 | 7/1973 | Fayling. | |
| 3,797,563 | 3/1974 | Hoffmann. | |
| 3,799,143 | 3/1974 | Bridges | 126/246 |
| 3,830,148 | 8/1974 | Shevlin | 219/432 |
| 3,875,370 | 4/1975 | Williams | 126/246 X |
| 3,908,749 | 9/1975 | Williams | 219/400 X |
| 3,982,584 | 9/1976 | Spanoudis | 165/42 |
| 3,987,719 | 10/1976 | Kian | 99/426 X |
| 4,005,745 | 2/1977 | Colato. | |
| 4,059,096 | 11/1977 | Schneider | 126/246 X |
| 4,068,115 | 1/1978 | Mack et al. | 219/386 |
| 4,093,041 | 6/1978 | Davis et al. | 219/386 X |
| 4,103,736 | 8/1978 | Colato. | |
| 4,116,363 | 9/1978 | Baker | 219/432 |
| 4,147,924 | 4/1979 | DeWitt, Jr. | 219/432 |
| 4,167,983 | 9/1979 | Seider et al. | 219/386 X |
| 4,235,282 | 11/1980 | de Filippis et al. | 219/400 X |
| 4,246,884 | 1/1981 | Vandas | 126/246 |
| 4,285,391 | 8/1981 | Bourner | 219/386 X |
| 4,323,110 | 4/1982 | Rubbright et al. | 219/400 X |
| 4,346,756 | 8/1982 | Dodd et al. | 219/400 X |
| 4,493,978 | 1/1985 | Starnes. | |
| 4,517,446 | 5/1985 | Torning. | |
| 4,780,597 | 10/1988 | Linhart et al.. | |
| 4,781,243 | 11/1988 | DeVogel. | |
| 4,805,526 | 2/1989 | Riva | 126/246 X |

OTHER PUBLICATIONS

Therma-Chill Food Productins Systems, Perfect-Temp Quality Meals at Lower Operating Costs Brochure (date unknown).
Aladdin Advanced Meal Systems, Temp-Rite II Excel Brochure, Nov. 1989.
Counselor, vol. 10, No. 1, 1988 (month unknown).
Aladdin Advanced Meal Systems Temp-Rite II Excel Rethermalization Cart Brochure, Nov. 1989.
Aladdin Advanced Meal Systems Walk-In Rethermalization Refrigerator Brochure, Nov. 1989.
Aladdin Advanced Meal Systems Rethermalization Systems Brochure, Oct. 1988.

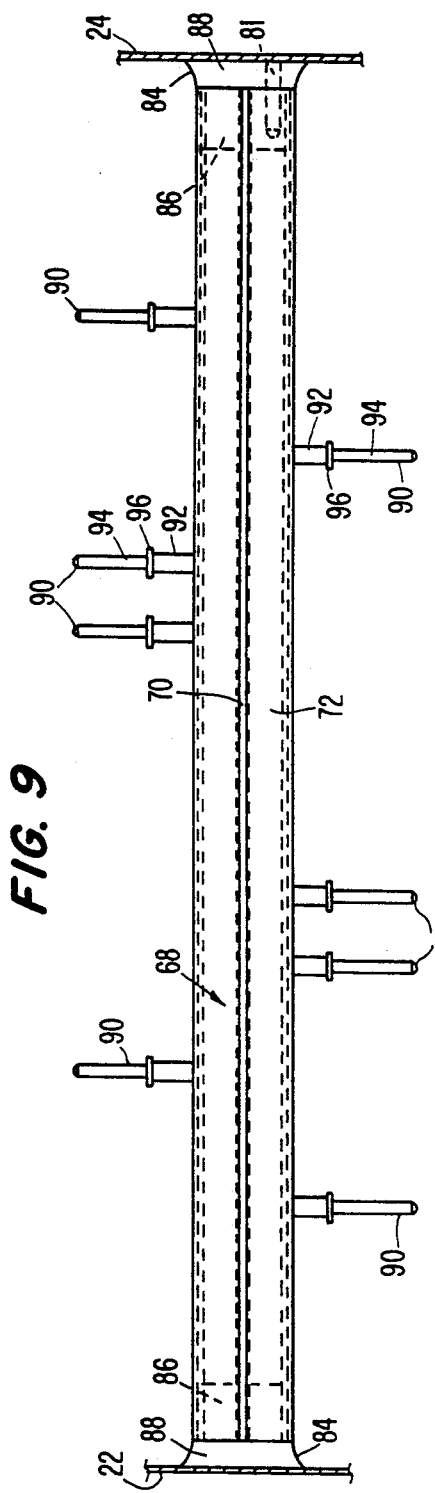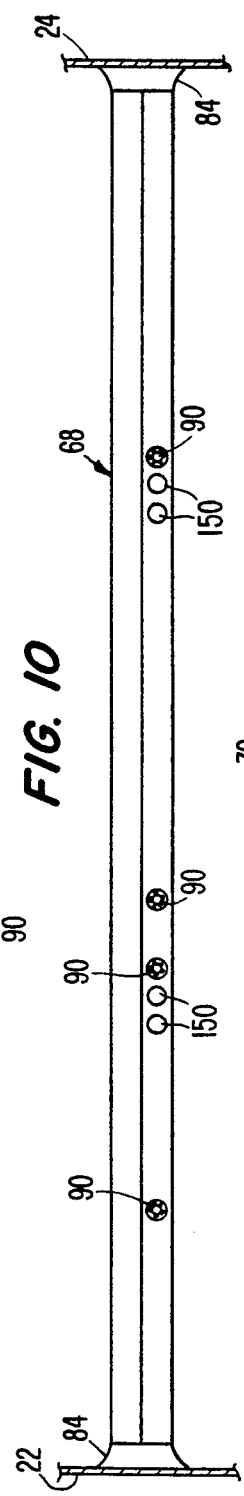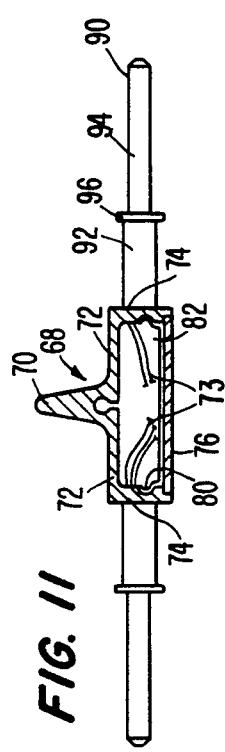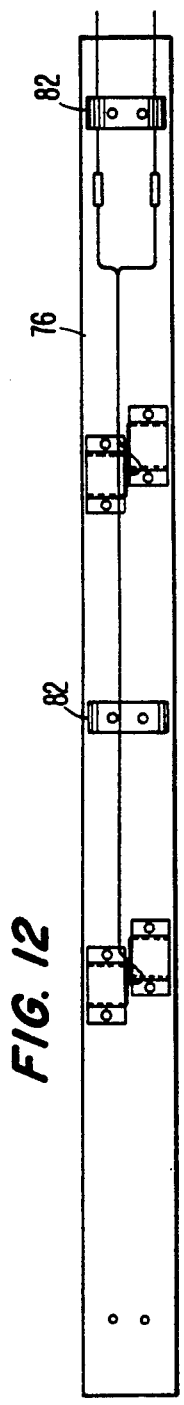

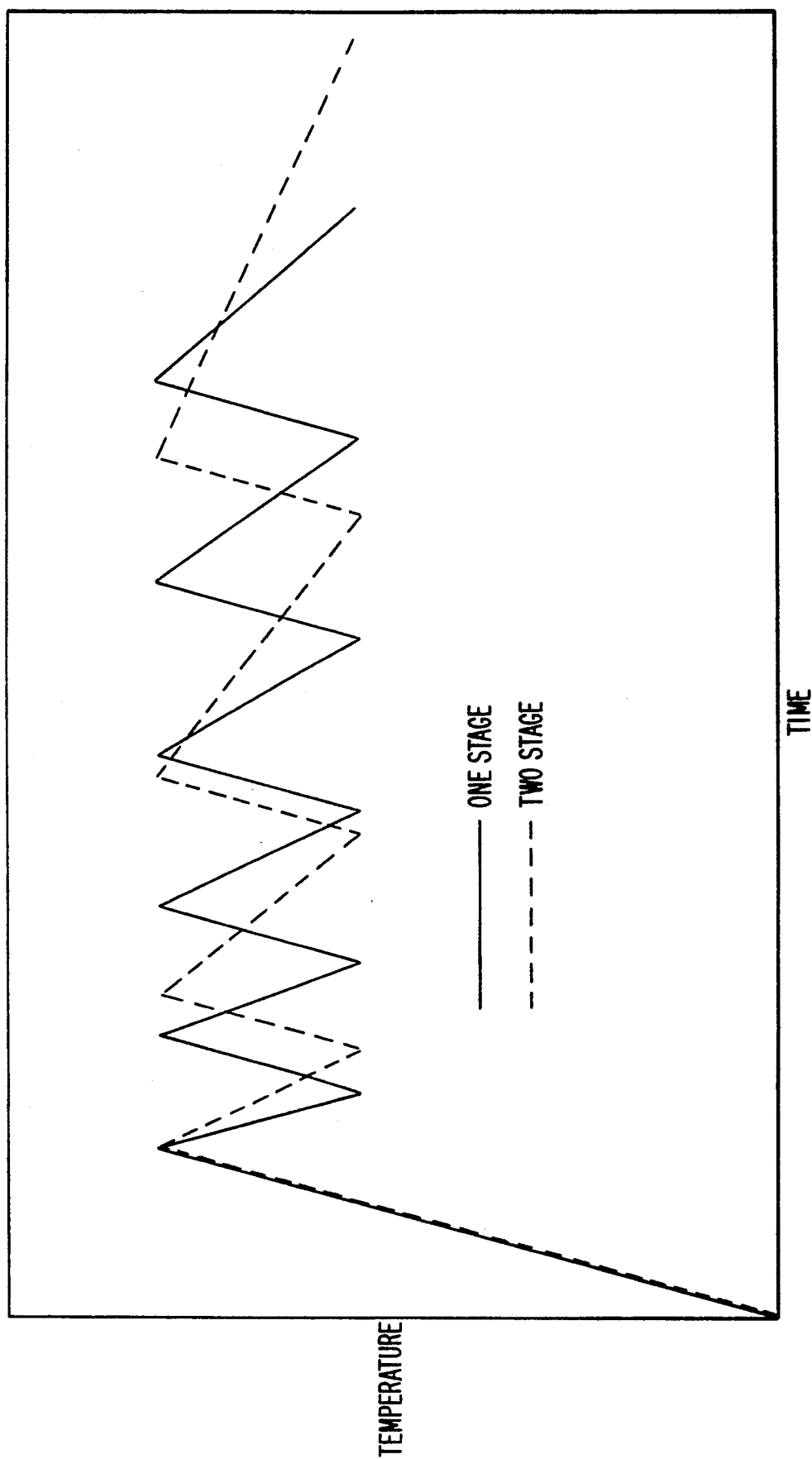

RETHERMALIZATION SYSTEM INCLUDING FOOD SERVICE DISH

CROSS-REFERENCE TO RELATED APPLICATION

This application is a continuation of application Ser. No. 07/471,483, filed Jan. 29, 1990 which is a division of application Ser. No. 07/394,204 filed Aug. 15, 1989 now abandoned.

TECHNICAL FIELD

The present invention relates to food service systems wherein individual portions of precooked food are supported on trays within moveable carts. The carts are placed in a chilled environment to store the food in a chilled state. Selected foods on the trays are rethermalized in the cart, i.e., heated to a hot serving temperature, while other portions of food on the trays remain in the chilled state. The rethermalization method of the present invention is directed to conductively applying heat to the selected food portions through a heating plate which is heated by a thermostatically controlled electrical heater.

BACKGROUND OF THE INVENTION

Various types of food service systems and conductive heating rethermalization methods are known in the prior art. A most basic food service system is one in which food is served immediately, or only a short time period, after the food is cooked or prepared. Typically in better restaurants, food is served immediately after it is cooked or prepared. Such immediate service of the food generally results in the best quality of food. In other environments such as fast food restaurants and cafeterias, food is not served immediately after preparation, but rather kept warm and served in the warm state. In fast food restaurants, food such as hamburgers is kept hot in disposable plastic containers. In cafeterias, food can be kept warm in the bulk state and served to individuals on a request basis, or food can be prepared in bulk and, thereafter, divided into individual portions and kept warm in a pellet system. A pellet system can also be used in non-cafeteria environments, such as hospitals wherein the food is placed on serving dishes and covered with insulated domes to keep the food warm until service.

A significant drawback of systems which keep food warm for a short period of time before service is that the time period during which the food can be kept safe and warm is relatively limited, and the quality of the food deteriorates over time.

A rethermalization system is another prior art type of food service system. In a rethermalization system, food is cooked or prepared and then chilled in bulk to 40° F. or less. Eventually the food is divided into individual portions and stored in a chilled state until it is reheated. The United States Food and Drug Administration (FDA) guidelines specify that the chilled and stored temperature must be 40° F. or less. A short time before the food is to be served, the food which is to be served hot is brought to a safe serving temperature, i.e. it is rethermalized. FDA guidelines specify that a safe serving temperature is 165° F. or greater. The present invention is directed to certain improvements in structural and functional aspects of a rethermalization system which uses conductive heating.

One manner of classifying prior art conductive heating rethermalization systems is by the location of the heating elements within the system. That is, prior art rethermalization systems have located the heating element in either a food serving dish, a dish supporting tray, or a shelf attached within a service cart.

U.S. Pat. No. 3,908,749 to Williams discloses a food service system wherein precooked foods are held on trays within a chilled environment cart. Food to be rethermalized is held within a dish which has an electrical resistance heating element embedded in its base. Contact buttons to connect the heating element to an electrical power source extend from the bottom of the base of the dish. The dish extends through a hole in a food service tray, and when the tray is supported in the service cart, the contact buttons rest on exposed leaf contacts which extend from a rear wall of the service cart.

Embedding the electrical heating element within the dish significantly increases the cost and complexity of the dish. A dish within a food service system undergoes severe handling since it must carry food, is subjected to heat for rethermalizing the food, and thereafter is subjected to heat, chemicals and handling impact in washing and drying processes. Thus, the dish is the component of this system which must be replaced most frequently. A system which incorporates the heating element into the dish thus has a relatively high long-term operating expense. Another disadvantage of this type of food service system is that relatively large electrical contacts must remain exposed in the cart to provide the electrical connection to the contacts of the dish. Such exposed contacts are thus subject to corrosion and water damage during operation and cleaning.

Food service rethermalization systems which incorporate heating elements into the service tray have disadvantages similar to dish heating element systems. That is, the cost of the trays is relatively high and the trays are subject to breakage because of frequent handling during food service and cleaning. Exposed contacts are also required to provide electrical connection to the heating elements embedded in the trays. Another disadvantage of tray heating element systems is that the trays become warped after a period of time due to the frequent heating and cooling cycles to which the trays are subjected and their relatively large planar configuration. Once the trays become warped, good surface contact between the heating element portion of the tray and the dishes to be heated is lost. As a consequence, accurate, and possibly adequate, heat is not applied to the food during rethermalization. Examples of food service rethermalization systems which utilize trays incorporating heating elements are found in U.S. Pat. Nos. 4,068,115 to Mack et al.; 4,167,983 to Seider et al. and 4,235,282 to deFilippis et al.

Food service rethermalization systems which incorporate the heating elements into shelves supported in the service cart alleviate the problem of the high cost of the more replaceable portions of the system, i.e. expensive dishes and trays. Furthermore, since the heating elements are formed as a portion of the cart, i.e. a shelf within the cart, the connection of the electrical heating elements to a power source is incorporated within enclosed portions of the shelf and cart, alleviating the problem of exposed contacts. However, rethermalization carts with shelf located heating elements do have certain limitations or disadvantages. Such systems generally incorporate a plurality of heating elements in a fixed manner into a single shelf. Thus, when one of the heating elements on a shelf becomes inoperative, the entire shelf must be replaced, rather than replacing the single inoperative heating element. Examples of food service rethermalization systems wherein the heating elements are incorporated into shelves within the service cart are found in U.S. Pat. Nos. 4,346,756 to Dodd et al.; 4,323,110 to Rubbright et al. and 4,285,391 to Bourner.

Prior art rethermalization food service carts have one or more columns of vertically spaced storage shelves on which trays carrying dishes of food are held. Dependent upon whether the tray at a given shelf location is carrying food to be heated, the heating elements at the respective shelf locations have to be activated at an appropriate time. Power to all of the heating elements is generally turned on manually or via an automatic timer program. However, separate activation of the individual heating elements at the shelf locations is dependent on whether or not food to be heated is present at the shelf location. One technique is to have the food service personnel activate a manual switch as the food tray is loaded on the shelf, if the tray contains food to be heated. However, such a technique is labor intensive and requires that the food service operator inspect the food on the tray or otherwise have an indication of whether food to be heated is present on a tray being placed onto the shelf.

Rubbright et al. '110 discloses a programmable system for activating heating elements at various shelf locations. In this system, a transport modular pack is programmed to have each heater element follow a particular and independent time/temperature curve dependent upon the food to be heated at the particular shelf location. This technique is very complicated and labor intensive, and requires special care and attentiveness by a skilled operator, since a specific time/temperature curve must be programmed by the operator into the modular pack for each individual meal.

Another prior art technique for activating the individual heating elements at the shelf locations relies upon tray positioning. In Seider et al. '983, electrical heater contacts on the dishes mate with projecting electrical power contacts at the shelf locations when the tray is positioned in one direction, but do not make electrical contact when the tray is positioned in the 180° opposite direction. In Bourner '391, a mechanical switch is placed at each shelf location and is activated by a tray cover when the tray is positioned in one direction, but is not activated when the tray is positioned in the 180° opposite direction, because of a cut out formed in the cover. Again, care must be taken by the food service operator in positioning the trays within the shelves. Frequently the loading of the shelves with the trays occurs at a separate location, or is attended to by a different person, from the loading of the food onto the tray. Thus, miscommunication or misunderstanding as to the food located on the tray can result in incorrect positioning of the tray.

Electrical conductive heaters in prior art rethermalization systems and rethermalization methods using such heaters have exhibited certain limitations or drawbacks in the manner in which the food is rethermalized. Most typically, a rethermalization system utilizes a resistance heater, which operates intermittently at a single power level during rethermalization, i.e. during the time when the food is initially brought from the chilled state to a serving temperature. The resistance heater is controlled by an on-off thermostat which operates between upper and lower temperature of limits. Typically, the resistance heater applies heat over a predetermined time period. While such a heating method has worked satisfactory, it is subject to certain limitations. For example, the system must be designed to work within a practical time period. While it would be desirable from a labor/cost standpoint to rethermalize chilled food as quickly as possible, it is difficult to achieve high quality food when rethermalization occurs too quickly. For example, certain portions of food may become scorched while others remain cold, or the food may become dehydrated or discolored when rethermalization occurs too rapidly.

One commercial rethermalization system accomplishes rethermalization of food in approximately one quarter of an hour. However, the range or variety of food which can be rethermalized is limited and special plating techniques are required for many of the lighter or more fragile foods. The term "plating techniques" refers to the special way or manner in which certain foods, which are to be rethermalized, are placed on dishware to assure that the foods retain their quality after rethermalization. Plating techniques are most frequently used with light and fragile foods. Examples of plating techniques include supporting food on a dish within a dish or on toast, adding gravy or water to the food, or spraying the dishes with a nonstick coating. Thus, while the time during which rethermalization takes place is less, any operating expense savings very likely lost by the added expense is required in the special plating techniques.

Conversely, when the time for rethermalization is significantly increased, for example, to one hour as suggested in Williams '749 for an entree of a meat and one or two vegetables, the need for special plating techniques is reduced and a wider variety of food can be rethermalized. However, a one hour rethermalization time period can be too long when three meals per day must be prepared in typical institutional environments such as hospitals, prisons or nursing homes since scheduling options for handling and recyling the carts for the next meal are limited.

The system disclosed in Bourner '391 rethermalizes chilled food in approximately a one-half hour time period. Such a rethermalization time period has proven to be a satisfactory compromise. That is, a relatively wide variety of food can be rethermalized without the requirement of using special plating techniques. Furthermore, the one-half hour time period has not proven to be too restrictive on service personnel, allowing sufficient time for preparation and service of three meals per day in an institutional environment.

Nevertheless, even the system disclosed in Bourner '391 has certain limitations. For example, an unrestricted range of foods cannot be rethermalized without special plating or quality degradation. It is difficult to rethermalize small portions of low density, fragile foods, while retaining high quality of the foods and at the same time rethermalize large portions of high density, difficult to heat foods within the same time period. It is believed that one of the causes of this limitation is that the thermostat which controls the heater must operate at a relatively high temperature range in order to sufficiently heat the more difficult to rethermalize food, and that at such higher temperature ranges, the easier to heat foods become overcooked.

A system which utilizes a resistance heater at a single power rating also has proven unforgiving when certain set parameters are varied. For example, if portion sizes are varied too much from specified portions, quality of the reheated food deteriorates. This is particularly true if too much of a dense food is placed in combination with too little of a fragile, low density food. Such a system is also very voltage dependent. Thus, if the voltage supplied to the heating elements drops significantly below the norm, for example more than 5%, insufficient power may be supplied by the heating elements to heat the higher density, more difficult to heat foods. Similarly, if the voltage supplied to the heating elements increases excessively, for example 10%, excessive heat may be supplied to the more fragile foods causing deterioration in the quality of these foods.

The system in Dodd et al. '756 uses a separate low power holding circuit for keeping food warm after it has been rethermalized. A higher power primary heating circuit is thermostatically controlled and used to rethermalize the food over a predetermined time period. Thus, while this system uses separate heaters having different power ratings, only the higher power heater is used for rethermalization, while the lower power heater is used primarily to keep the already rethermalized food warm. A switch is used to select between the two heating options.

The system in Mack et al. '115 uses PTC power heaters as the preferred type of heater embedded in the dish. The use of a resistance heater controlled by a thermostat is mentioned as an alternative to the PTC heater. The PTC heaters operate basically as multi-modal resistance heaters so that below their critical temperature they have a low electrical resistance, while above it the resistance is very high. Near the critical temperature, the resistance varies between the extremes. Therefore, depending upon temperature a PTC heater will deliver different wattages. During the development of the present system, it was found that PTC heaters had both structural and functional disadvantages. The heaters initially draw very high current, requiring more expensive high power capability electrical service. Also, if the initial input temperature of the food varied from preset standards, the heaters would not adequately heat the food to proper serving temperature.

The Rubbright et al. '110 system programs an individual time/temperature curve for each heater element. A predetermined time period is not used for all of the types of foods to be rethermalized. Rather, a particular time/temperature curve is used to control heater temperature and time independently for each heating element depending upon the type of food being rethermalized. A certain number of programs are available for use and are coordinated with various types or combinations of foods. The food service operator thus must coordinate the particular food or combination of foods with the appropriate program. The food service handling process is thus complicated, requiring extra care and attention during meal preparation and special training for the operators of the system.

The configuration of the dish in the prior art has typically been a flared outerwall design with a lip at the uppermost portion of the dish. The flared outerwall requires less precision with respect to the width of the opening in the tray. However, if the outerwall is flared too much, there will be too much "slop" due to the loose fit between the dish and the tray. This can lead to a shifting of the dish and concomitantly a shifting of the contents of the dish. This is undesirable.

Another consideration in the configuration of the dish is the desirability of allowing dishes to be stacked and/or nested within one another. With dishes having a flared wall, it is preferably to provide a lip at the top of the dish to provide a contact point and prevent movement between stacked dishes. However, if it is desired to make the dish more shallow, the use of a lip at the top of the dish may not be sufficient to achieve these objectives.

The food service system and method of rethermalization of the present invention was developed to overcome the structural and functional limitations of the prior art systems and methods discussed above.

SUMMARY OF THE INVENTION

The present invention is directed to a heating system for use in a food service cart for storing and heating foods. The system includes a plurality of vertically spaced tray supports attached to the cart for supporting food service trays at a plurality of vertically spaced shelf locations, and a plurality of heaters attached to the cart at a plurality of vertically spaced locations in alignment with the shelf locations for heating foods carried on service trays and supported by the tray supports. A mechanism initiates the supply of power to the heaters and a timer turns the power off to the heaters after a predetermined time period has elapsed. A thermostatic control controls the power supplied by each respective heater during the predetermined time period. The control includes a sensing device for sensing temperature and a power adjusting device for adjusting the power supplied by the heater. The sensing device senses temperature over a predetermined range having upper and lower temperature limits, and the power adjusting device reduces the power at which the heater operates to a lower power level when the sensing device senses the upper temperature limit and increases the power at which the heater operates to a higher power level above the lower power level when the sensing device senses temperature at or below the lower temperature limit. The present invention is also directed to a heater module per se which incorporates the heater and thermostatic control.

In a preferred embodiment, each heater includes an electrical heating element, and the power adjusting device includes a switch which shorts a portion of the heating element out of the operative heater circuit to operate the heater at the increased power level, and which places the portion of the heating element into the operative heater circuit to operate the heater at the reduced power level.

Another aspect of the present invention is directed to a method of heating precooked food stored at a plurality of locations within a food service cart. According to the method, a preselected amount of food to be heated is supported adjacent an individual heater, and heat is supplied to the food from the heater over a predetermined time period in a thermostatically controlled manner as follows: Heat is initially supplied at a high power level from the beginning of the predetermined time period; and thereafter reduced to a low power level lower than the high power level when an upper temperature of a temperature range of the thermostatic control is reached. The heater operates at the low power level until a lower temperature of the temperature range is reached and then increases to a higher power level above the low power level. The heat is again reduced to a low power level lower than the higher power level when the upper temperature of the temperature range is reached; and the steps of reducing and increasing the power are continuously performed over the predetermined time period to continuously supply heat from the heater to the food during the predetermined time period.

Another aspect of the present method relates to selecting a range of foods with various heat energy requirements to be rethermalized; and to selecting of an appropriate rethermalization time period and low and high power levels which will satisfactorily rethermalize the range of foods.

The terms two-stage heater and two-stage method of rethermalization will be used herein as shorthand terminology for the heater and thermostatic control which supplies power continuously during the rethermalization time either at a high power level or at a low power level, and to the method of rethermalization using the application of heat at the high and low power levels. The two-stage heater and method of rethermalization overcomes, to a degree, certain food processing limitations of a single-stage rethermalization heater (the on-off operation of a single-power heater). For example, foods with a broader range of heat energy requirements can be rethermalized with the two-stage heater without degrading food quality. As a corollary, less special plating techniques are required for the lower density, fragile foods. Also, a mixture of high energy requirement and low energy requirement foods can be more readily rethermalized simultaneously using the two-stage heater. Such mixed rethermalization with the two-stage heater works particularly well with round dishes which both are aesthetically pleasing and allow freedom to vary portion sizes of one, two, or three foods.

The two-stage heater system and method is also more forgiving in various respects over a single-stage rethermalization heater system and method. That is, accurate portion sizes are not as critical when the two-stage heater and method is used. Similarly, variations in the voltage applied to the heaters does not as readily affect the quality of the rethermalized food.

Another advantage of the two-stage heater and method is that a lower and narrower thermostat range can be used within the predetermined rethermalization time period. When a lower and more accurate thermostat range is used, there is less chance that the food will become scorched, or that the more fragile foods will have their quality degraded. Also, excess power is not used when meals consisting primarily of light, fragile foods reach the desired serving temperature.

Another aspect of the present invention is directed to a system for selectively activating individual heaters in a food service cart. An individual switch mechanism is connected to each of the heaters for turning power on and off separately to each one of the heaters. A switch activator mechanism activates the switch mechanism, and is associated with covers for hot food to be carried on the service trays whereby one of the switch mechanism turns power on to a respective one of the heaters when one of the covers is carried by a tray and supported in the cart above the last-mentioned switch mechanism. In one embodiment, the switch mechanism includes a pivotable housing, a magnet supported at one end of the housing and a mercury switch activated and carried by the pivotable housing. A preferred form of switch activator mechanism is a ring of magnetic material supported in the base of the food cover.

The system which uses an individual switch mechanism connected to each heater in combination with a switch activator mechanism carried in the covers for hot food simplifies the process of activating the individual heaters, as well as reduces the likelihood of error in activating the heaters. As food is placed on dishware, it is common practice to place a cover over food which is intended to be hot. The present system accomplishes individual heater activation by this simple one-step process. The step of manually, and individually, activating a switch for each shelf location, programming a control module for each meal, or properly orientating trays within a service cart is thereby eliminated.

A further aspect of the present invention is directed to a heater module for use in a food service cart wherein a heating element housing is removably attached to the cart at a shelf location. A heater plate sized to contact one food carrying member, and at least one electrical heating element are carried in the heating element housing with the heating element in thermal contact with the heater plate. The heating element housing includes a mechanism for removably attaching the housing to the cart whereby the heating element for a respective heater plate is individually removable from the cart by removing the heating element housing. The heating element housing preferably has a pair of openings for receiving a pair of support pins extending from a support beam in the cart. Repair, replacement and cleaning of heating elements and heaters is simplified by the present heater module since each individual heater can be removed separately. In prior art shelf-mounted heaters, a plurality of heaters was fixedly attached to each shelf location so that individual replacement and repair of the heaters could not be accomplished.

Another aspect of the present invention is directed to a dish for use in a rethermalization device wherein the dish has a unique outerwall configuration to allow shallow dishes to be stacked and to prevent the "slop" or loose fit associated with prior art dishes having flared outerwalls.

Various advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof and to the accompanying descriptive matter, in which there is illustrated and described preferred embodiments of the invention.

BRIEF DESCRIPTION OF THE DRAWINGS

FIG. 9 is a top plan view of a generally T-shaped heater element support bar;

FIG. 10 is a front view of the support bar;

FIG. 11 is a cross-sectional view taken generally along line 11—11 of FIG. 9;

FIG. 12 is a plan view of a cover plate for the support bar;

FIG. 25 is a graph illustrating a theoretical comparison between a two-stage heater in accordance with the present invention and a single-stage heater.

DETAILED DESCRIPTION

Food Service System

Figure 1:
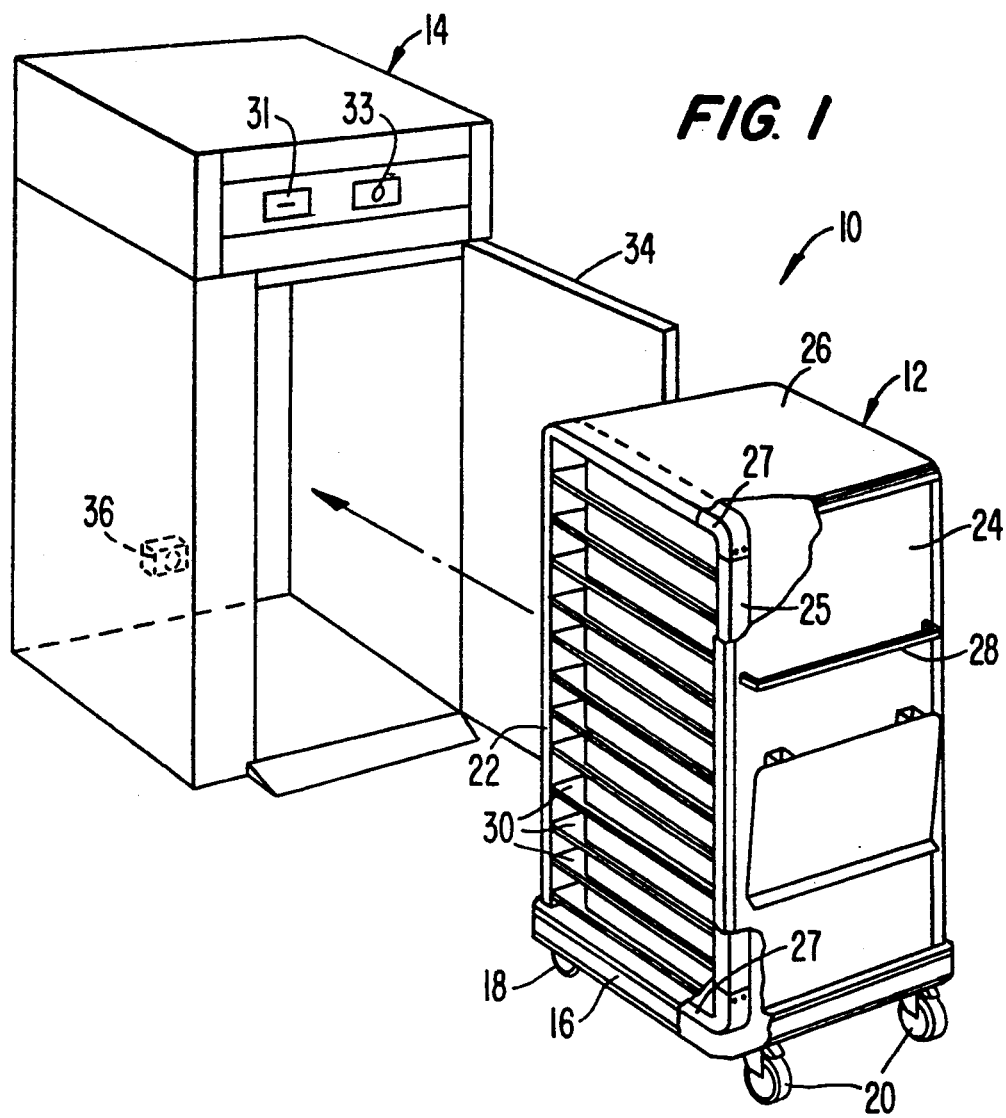
FIG. 1 is a perspective view of a food service system including a mobile food service cart and a refrigeration cabinet.
Figure 2:
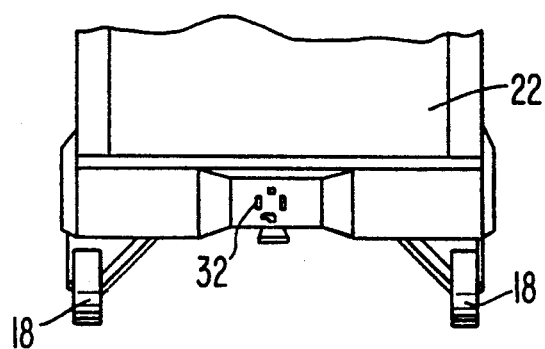
FIG. 2 is a partial rear view of the food service cart.

Referring to the drawings, wherein like numerals indicate like elements, there is illustrated a food service system indicated generally as 10. Food service system 10 includes a mobile food service cart 12' which functions as a rethermalization and service cart, and a refrigeration cabinet 14.

Cart 12 is formed generally of sheet metal and includes a support base 16. A first pair of wheels 18 depend from one of the sides of base 16 and a second pair of steerable and lockable wheels 20 depend from its other side. A first side wall 22 extends upwardly from a first side of base 16 and a second side wall 24 extends upwardly from a second side of base 16. A top wall 26 is connected to and extends between the upper ends of first and second side walls 22 and 24. Tubular members 25 (one of which is shown along the front edge of cart 12 in FIG. 1) are attached to the front and back edges of each side wall 22 and 24; and generally U-shaped tubular members 27 are attached to and connected between top wall 26 and side walls 22 and 24, and base 16 and side walls 22 and 24, along the front and back edges of cart 12. Tubular members 25, 27 provide additional rigidity to cart 12. A handle 28 is attached to the exterior of side wall 24, and is used to move and steer cart 12. The front and back of cart 12 are open to allow free access for the insertion and removal of food service trays 30. Male electrical connector contacts 32, which connect cart 12 to an electrical power source, extend from base 16 immediately below side wall 22.

In use cart 12 is loaded with trays 30, which in turn support precooked or otherwise prepared food. Thereafter, cart 12 is wheeled into refrigeration cabinet 14 where it will be stored in a chilled state until rethermalization. Refrigeration cabinet 14 includes a front access door 34 to allow entry and removal of cart 12, and which seals the refrigeration cabinet. A female electrical receptacle 36 is attached to the interior back wall of cabinet 14. When cart 12 is backed completely into cabinet 14, contacts 32 engage receptacle 36 to thereby connect cart 12 to a main electrical power supply in a conventional manner. Electrical power to receptacle 36, and, hence, cart 12 can be initiated manually through switch 31, or switch 31 can be programmed to turn power on at a preselected time. A conventional timer 33 is also provided to control the amount of time that power is supplied to the cart.

If cart 12 is to be used in a centralized rethermalization system, cabinet 14 can be replaced by a refrigerator room wherein a plurality of spaces and electrical receptacles are provided for a plurality of carts 12, and the entire room is refrigerated.

Food Service Tray and Dishware

Figure 3:
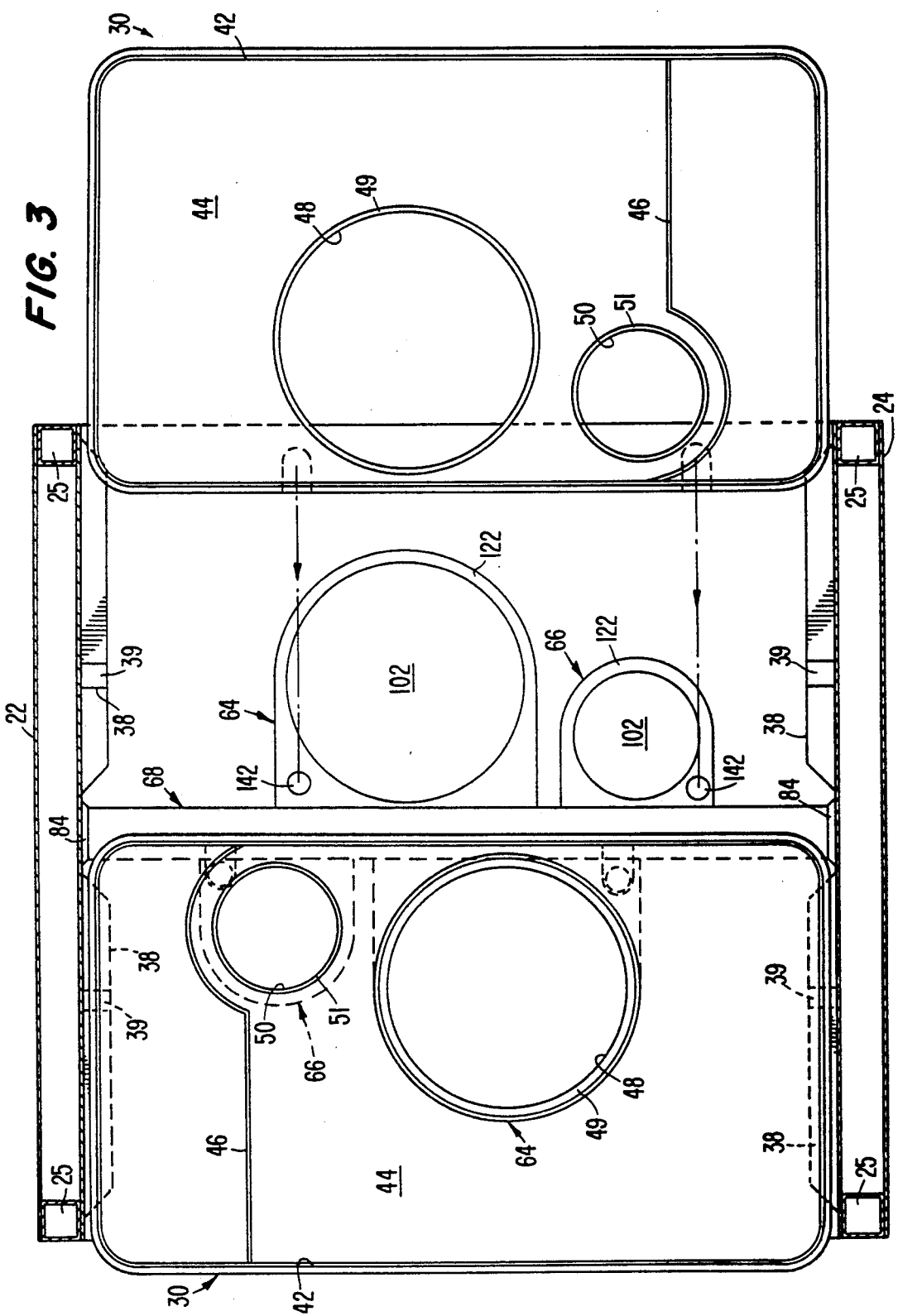
FIG. 3 is a horizontal sectional view of the food service cart, illustrating one food tray supported at a shelf location and another food tray in the process of being inserted into a shelf.

As seen in FIG. 3, a pair of support bars 38 are attached to the inside surfaces of side walls 22 and 24 at both the front and back of cart 12. At a given horizontal location, support bars 38 define a front and back shelf location to support a pair of trays 30.

Figure 4:
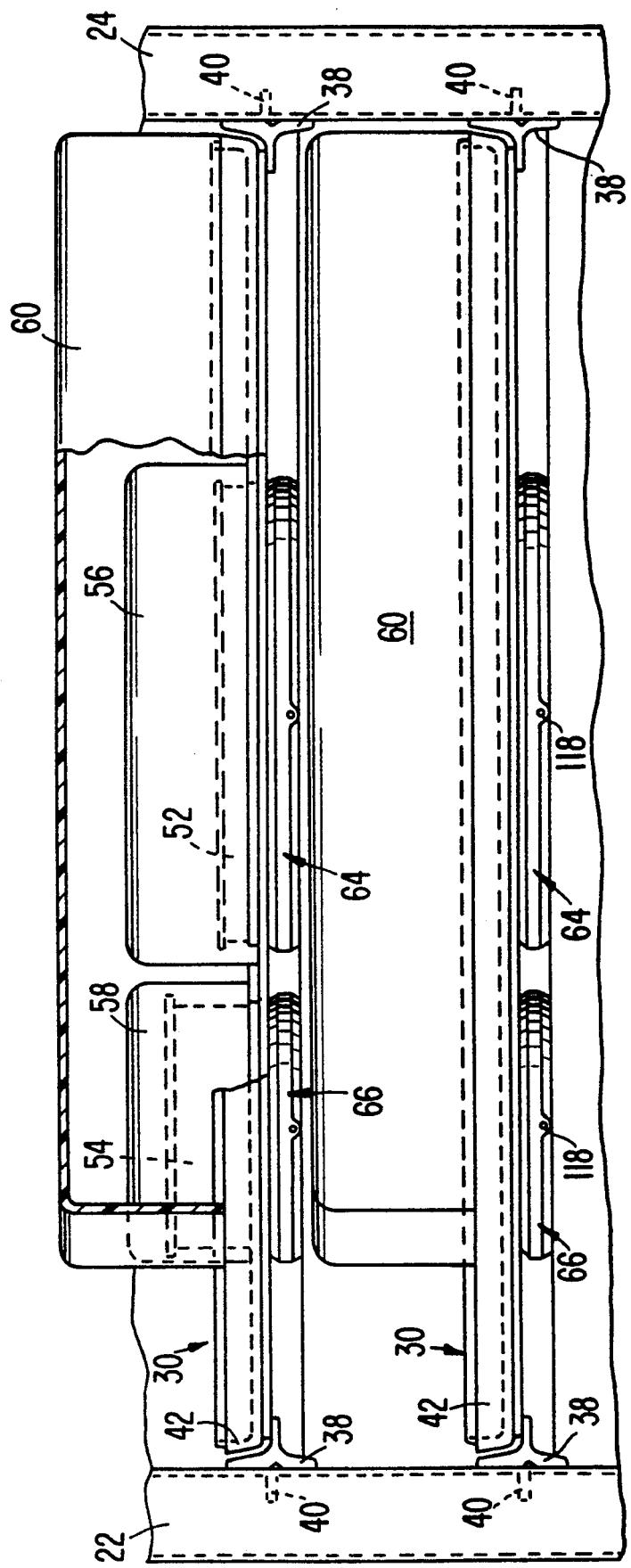
FIG. 4 is a partial front elevational view illustrating trays, dishware, and covers supported at shelf locations with one overall cover partially broken away.

Support bars 38 are preferably formed of a rigid plastic. As seen in FIG. 4, support bars 38 have a generally T-shaped cross-section with pins 40 formed integral with the top section of the T. Pins 40 extend through apertures in side walls 22 and 24 to thereby secure support bars 38 to side walls 22 and 24. An alignment and locking projection 39 extends from the top surface of support bars 38. Projection 39 mates with a slot 41 along the bottom edge of tray 30 to hold tray 30 in position.

Figure 5:
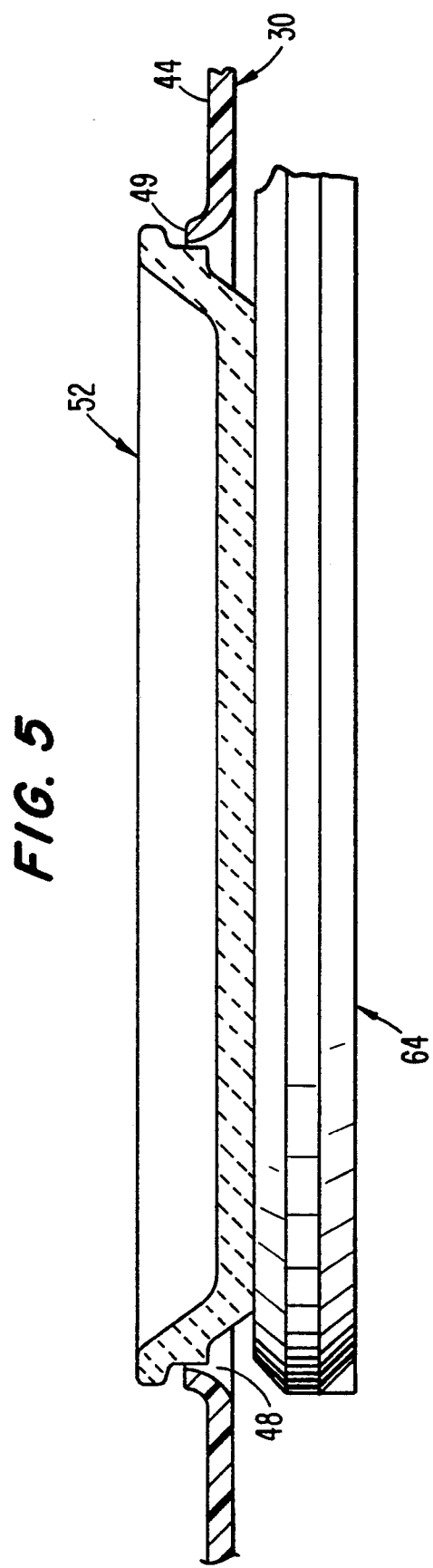
FIG. 5 is a partial sectional view illustrating dishware supported on a heater.
Figure 6:
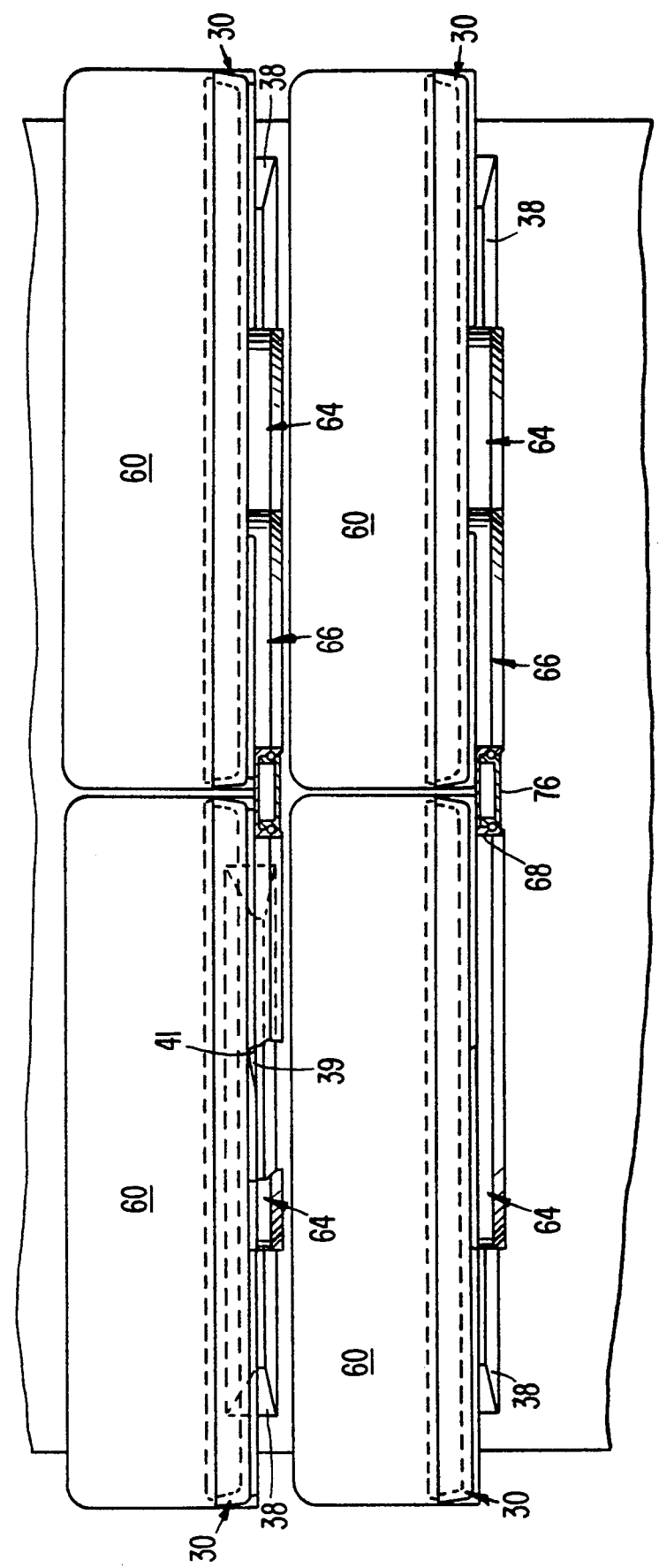
FIG. 6 is a partial side elevational view with the side wall of the service cart removed and illustrating food trays and covers supported at horizontally spaced shelf locations.

Tray 30 has a generally rectangular configuration with an upstanding peripheral rim 42, which extends upward from a support surface 44. A divider 46 also extends upward from the support surface 44 and divides surface 44 into a food holding area and a utensil/napkin holding area. In the food holding area a round large entree opening 48, and a round small soup opening 50, are formed. A rim 49 extends upward from surface 44 and around the periphery of opening 48. A rim 51 extends upward from surface 44 and around opening 50. As seen in FIG. 4, an entree dish 52 fits within entree opening 48 and a soup bowl 54 fits within soup opening 50. Entree dish 52 and soup bowl 54 both have a generally round shape. As seen in FIG. 5, the diameter of dish 52 increases slightly from its smallest diameter along its bottom surface, and is correlated to the diameter of opening 48 such that the bottom surface of dish 52 extends down slightly below the lower surface of tray 30, and the side and upper rim of dish 52 are out of contact with rim 49 of tray 30. The diameter of soup bowl 54 is likewise correlated to the diameter of opening 50.

As shown in FIG. 5, the outerwall of dish 52 has a configuration as follows. From the base, there is a flared portion characterized by the outerwall being flared outwardly from the base to a first predetermined point. The dish also has a step portion characterized by the outerwall protruding sharply outward with respect to the center of the dish from the first predetermined point to a second predetermined point. The outward protrusion or step may be substantially parallel to the base of the dish. From the outermost point of the protrusion, the outerwall has a vertical portion which extends substantially vertically upwards (has a relatively constant diameter) to a third predetermined point whereat the outerwall may extend outwardly to form a lip at the uppermost portion of the dish. Preferably the protrusion occurs at a position that when the dish is inserted through opening 48 of tray 30, the protrusion is below the upper portion of rim 49 of tray 30. Also, the diameter of dish 52 at the outermost portion of the protrusion is less than the diameter of opening 48. The first, second and third predetermined points are all preferably between the base and the uppermost portion of the dish.

This novel configuration provides the advantages of minimizing "slop" between the tray and dish and provides for better stacking/nesting of similar dishes. This is especially true if it is desired to make the dish shallower since the protrusion of one dish nests against the rim of the next dish. With the prior art flared-type outerwall, there is less stability when stacking dishes.

As also shown in FIG. 5, the dish may preferably have a round shape as opposed to a rectangular shape of the prior art. This round shape provides more surface area, therefore it is not necessary to make the dish as deep. This allows for shallower dishes to be used.

Entree dish 52 and soup bowl 54 are designed to be capable of holding hot foods. An insulated entree cover 56 is therefore provided to cover dish 52 and food held on the dish; and an insulated soup cover 58 is provided to extend over and cover soup bowl 54. A disposable lid is also placed directly on top of soup bowl 54. The diameter of cover 56 is greater than the diameter of dish 52 and slightly greater than the outside diameter of rim 48. In this manner, cover 48 is aligned over dish 52 and opening 48 so that the base of cover 56 rests on support surface 44. In a similar manner, the diameter of soup cover 48 is greater than the diameter of soup bowl 54 and rim 51.

Figure 8:
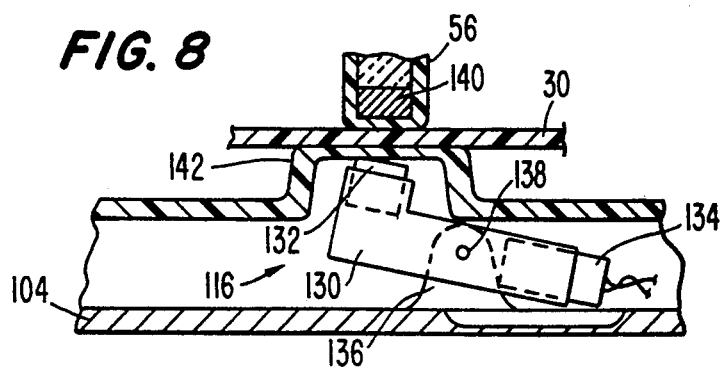
FIG. 8 is a cross sectional view taken generally along line 8—8 of FIG. 7 with a portion of a tray and cover illustrated above the heater module.
Figure 13:
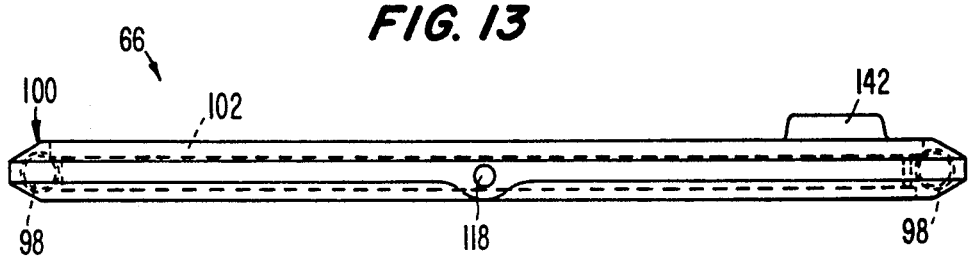
FIG. 13 is a front elevational view of a heater module.
Figure 14:
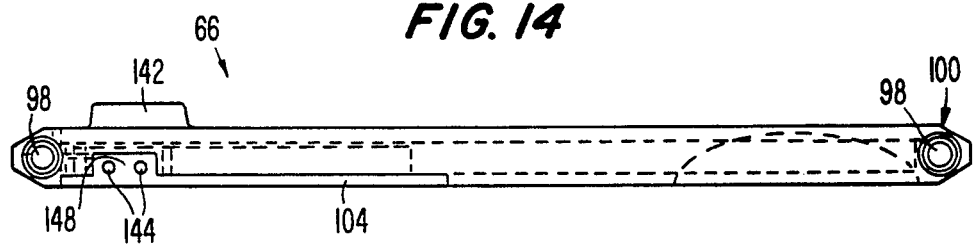
FIG. 14 is a rear elevational view of the heater module.
Figure 15:
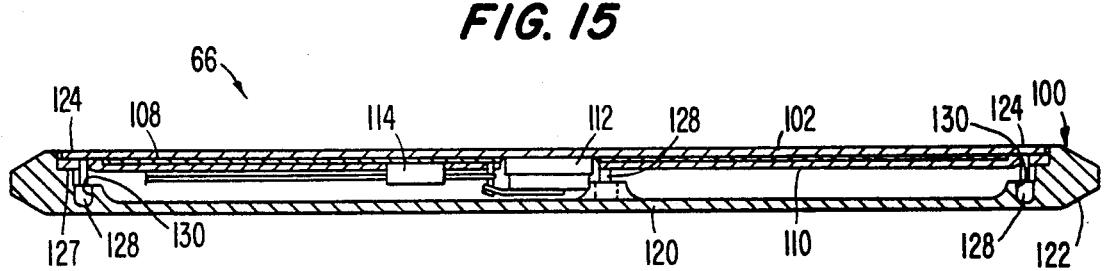
FIG. 15 is a cross-sectional view taken along line 15—15 of FIG. 7.
Figure 16:
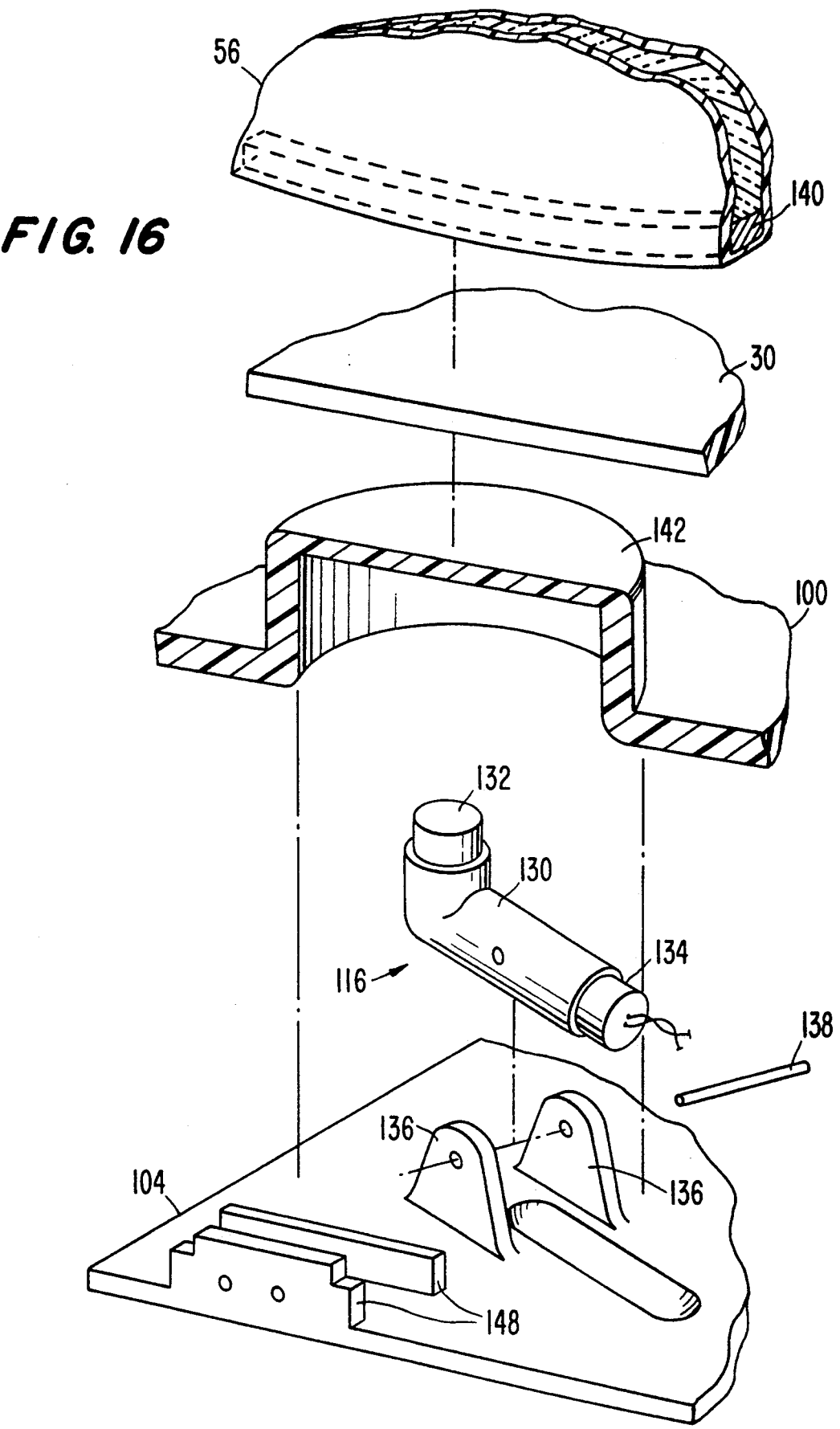
FIG. 16 is a partial exploded perspective view of a heater module, tray and cover, illustrating a pivoting switch.

An overall food cover 60 is provided to cover the entire food carrying area of support surface 44. Cover 60 provides protection for foods, other than hot food covered by covers 56 and 58 which are supported in the food service area 44 of tray 30. The utensil/napkin support area remains open so that utensils, napkins, menu and patient identification can be placed on the tray after all the food has been placed on tray 30 and covered. Covers 56 and 58 are insulated covers preferably formed of an outer hard plastic shell filled with an insulation material as seen in FIGS. 8 and 16. Cover 60 is preferably formed of a rigid injection molded plastic.

Heating System

As seen in FIG. 3, a pair of large entree heater assemblies or modules 64 and a pair of small soup heater assemblies or modules 66 are located at each horizontal shelf location. FIGS. 9, 10, 11 and 12 illustrate the support structure for supporting heater modules 64 and 66 at the horizontal shelf locations. As seen therein, a generally T-shaped bar 68 extends between opposite side walls 22 and 24. T-bar 68 is preferably formed of a high strength aluminum material and includes a central rib 70, a cross member 72 which extends perpendicularly from opposite sides of rib 70, and a pair of wall members 74. Wall members 74 extend perpendicularly away from opposite distal ends of cross member 72 so that a hollow open-ended rectangular area is defined between cross member 72 and wall members 74. A base cover 76 fits within the hollow area and covers the open end between walls 74. Wiring, shown diagrammatically as 73, extends through the hollow area to connect the heater modules to a main power source through contacts 32. A plurality of notches 80 are formed in the interior of wall member 74, and projections or clips 82 extend from an upper surface of cover 76 and fit within notches 80 to secure base cover 76 in place.

A plastic end piece 84 is located at each end of bar 68 and disposed between a respective end of bar 68 and one of the walls 22, 24. Each end piece 84 has a small cross section portion 86 which frictionally fits into the hollow interior of bar 68, and an exterior portion 88 which fits between the interior surface of the wall members 22 and 24 and the distal ends of bar 68. Exterior portion 88 has a curved exterior surface.

Figure 7:
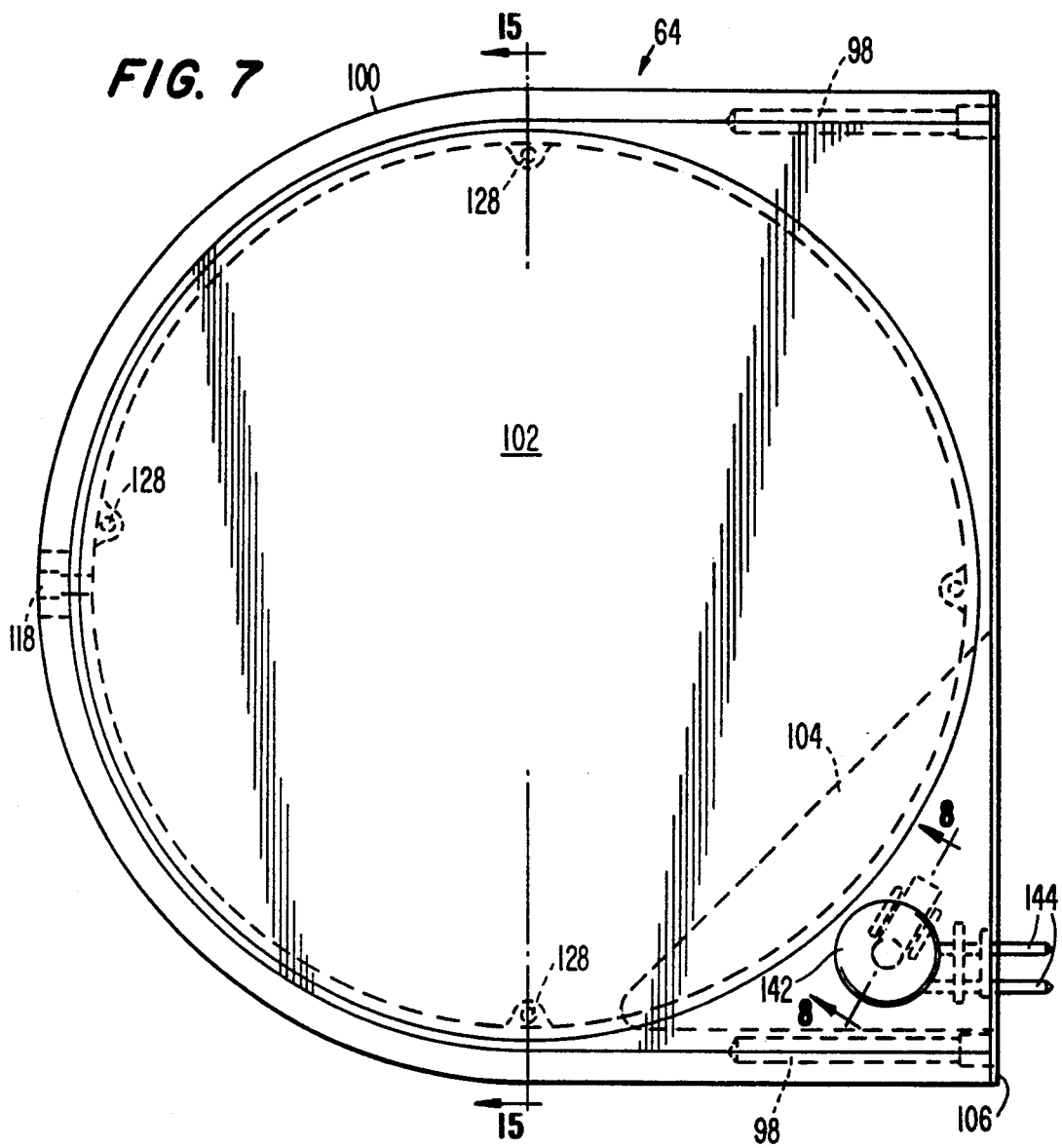
FIG. 7 is a top plan view of a heater module with selected internal details shown in dash line.

Bar 68, base cover 76 and end pieces 84 are secured to walls 22 and 24, preferably by screws, one of which 81 is shown in dash-line in FIG. 9, extending through the walls and into end pieces 84. Four support pins 90 extend from each longitudinal edge of bars 68. Each pin 90 is attached to bar 68 in a conventional manner, preferably by screw threads. Pins 90 have a large diameter base portion 92 and a small diameter distal portion 94. A friction member, such as an O-ring 96, is secured to the distal end of base portion 92. Pins 90 function to support heater modules 64 and 66 in a cantilever manner from bar 68. As seen in FIG. 7, a cylindrical bore 98 is formed through the housing of heater module 64 adjacent each of its sides. Similar bores are formed in heater module 66. Pairs of pins 90 fit within bores 98 to support the heater modules. In this manner, heater modules 64 and 66 are supported at a plurality of vertically spaced shelf locations. The pin 90 and bore 98 connection and support technique allows each individual heater module, which is sized to heat a single dish or bowl, to be individually removed for service or replacement.

Figure 17:
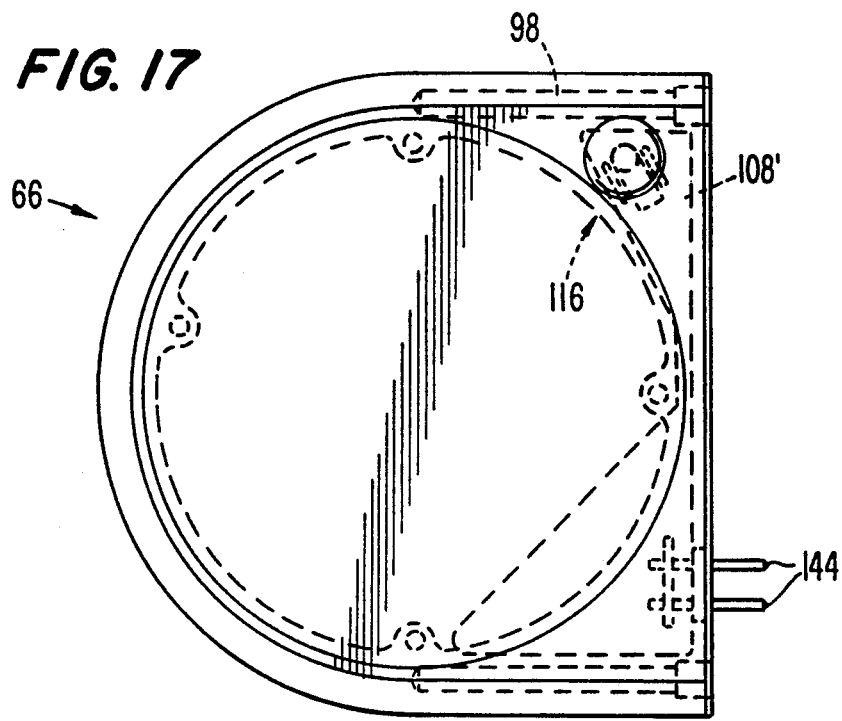
FIG. 17 is a plan view of a smaller heater module.
Figure 18:
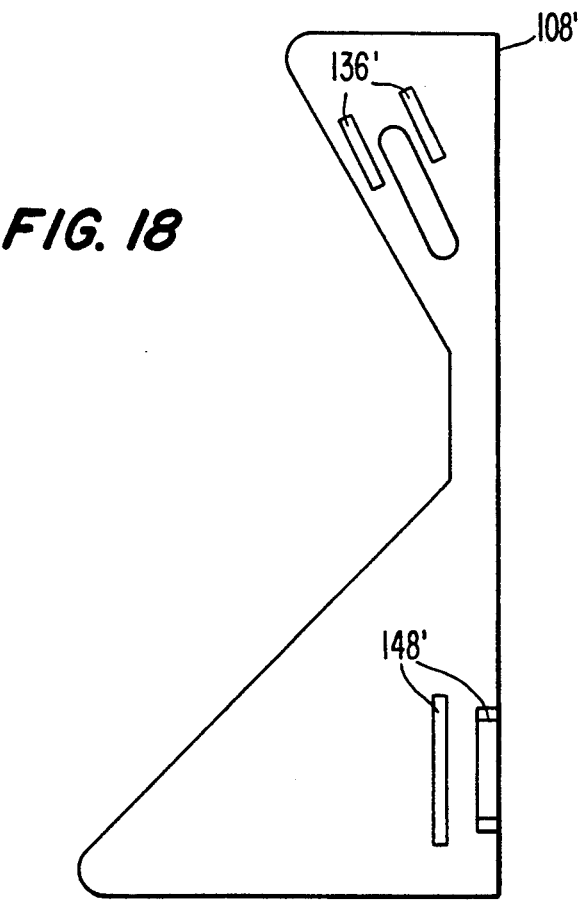
FIG. 18 is a plan view of an attachment plate of the module of FIG. 17.

Details of heater module 64 are best seen in FIGS. 7, 8 and 13-15. Heater module 66, except where noted otherwise particularly with reference to FIGS. 17 and 18, is constructed similar to heater module 64. The exterior of heater module 64 is defined by a plastic housing 100, a metal heater plate 102, a plastic switch attachment plate 104 and a rubber or plastic gasket 106. The components which are held within the interior of heater module 64 include a resistive electrical heating element 108, an insulation plate 110, a thermostat 112, a fuse 114, a pivot switch mechanism 116, and an indicator light 118.

Housing 100 is formed of a relatively rigid, high temperature resistant, injection molded thermoplastic. Housing 100 includes a bottom or base 120 and a peripheral wall 122 extending upward from bottom 120 about the periphery of housing 100. Peripheral wall 122 has a tapered or slanted top and bottom exterior surface along the front and sides of housing 100. The slanted top surface, along the front of housing 100, assists in guiding a dish into position on top of the heater. A round opening 124 is formed in peripheral wall 122 and includes a support ledge 126.

Heater plate 102 is preferably formed of a nickel plated aluminum plate having a thickness of approximately of ⅛". Plate 102 is generally round and has a circular perimeter generally mating with the configuration of round opening 124. A plurality of support legs 128 extend downward at a plurality of locations about the perimeter of heater plate 102. A resistive heating element 108, such as shown in FIG. 20, secured to the bottom of heater plate 102.

Figure 20:
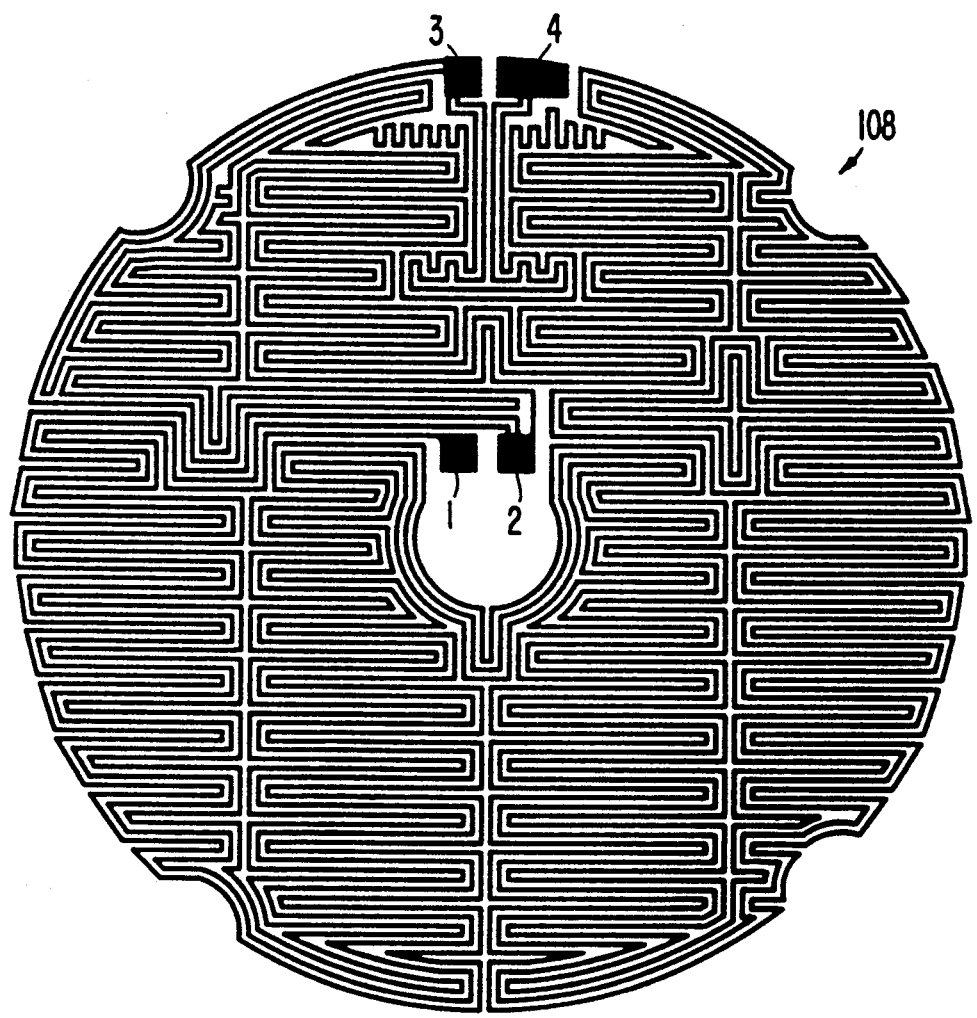
FIG. 20 is a diagrammatic view of the resistance pattern of one embodiment of a heater element.

Element 108 is preferably formed of a resistance foil in the pattern illustrated in FIG. 20. The foil is encased in a silicon rubber and is attached to plate 102 during vulcanization of the rubber by the application of heat and pressure. Plate 110, formed of an insulative material, such as a ceramic fiber or the like, is thereafter secured in position below heating element 108 by resting on top of ledge 126. Thermostat 112 is secured with an adhesive directly to the bottom of heater plate 102 within a centrally located opening in heating element 108. Heater plate 102 and the components secured to it are attached to housing 100 by securing legs 128 within holes 130 formed within housing 100 adjacent peripheral wall 122. The border between heater plate 100 and opening 124 is sealed with a room temperature vulcanized silicon rubber to prevent entry of liquid into the interior of the housing.

Switch attachment plate 104 has a generally triangular configuration as seen in FIG. 7. A mating support ledge, which follows the peripheral contour of plate 104, is formed in the bottom of housing 100 and, as seen partially in FIG. 14, plate 104 fits on the support ledge. Plate 14 is permanently secured to the support ledge by either an adhesive or welding, preferably by sonic welding. The interior of housing 100 is thus hermetically sealed, allowing heater 64 to be cleaned in a pressure washing process. Plate 104 supports pivot switch mechanism 116, which functions to individually activate heating element 108 in each respective heater assembly. Pivot switch mechanism 116 includes an L-shaped housing 130 with a magnet 132 carried in one open end of housing 130, and a mercury switch received within an opening in the other end of housing 130. A pair of support flanges 136 extend upward from the interior of plate 104 to pivotally support housing 130 via a support pin 138 passing through holes in flanges 136 and housing 130.

In the deactivated state of switch 116, the end of housing 130 which carries magnet 132 is pivoted downward and the opposite end carrying mercury switch 134 is pivoted upward. In this position mercury switch 134 is in its open state and power is not supplied to heating element 108. Switch 116 is activated by placing an insulated cover 56 over a dish of food to be rethermalized. As seen in FIG. 8 and 16, an annular ring 140 of a magnetic metallic material is held within the perimeter of cover 56 adjacent its base. As seen in FIG. 8, with tray 30 and cover 56 in position, magnet 132 is drawn upward toward metallic ring 140 and mercury switch 134 pivots downward to be placed in its closed state. Activation of an appropriate heater module is thus readily assured, since whenever an insulated cover is placed over food to be heated, the heater module is automatically activated. A cylindrical projection 142 is formed integral with the upper surface of housing 100 to receive magnet 132 and allow sufficient upward pivoting to activate mercury switch 134. A pair of electrical connector pins 144 are supported by a pair of spaced flanges 148 formed on plate 140 in a hermetically sealed manner. Pins 144 connect to a main power supply by-passing through holes 150 in the side T-bar 68 and connecting to electrical wiring 74 supported within the hollow interior of T-bar 68.

FIGS. 17 and 18 illustrate details of small heater module 66. As seen therein, attachment plate 108' differs in configuration from attachment plate 108 used in module 64. Attachment plate 108' extends across the entire back of module 66 and has the configuration of two triangles connected by a central strip. Switch 116 is supported on flanges 136' on one of the triangles, and connector pins 144 extend from flanges 148' the other triangle. Otherwise, module 66 is constructed similar to module 64.

Figure 19:
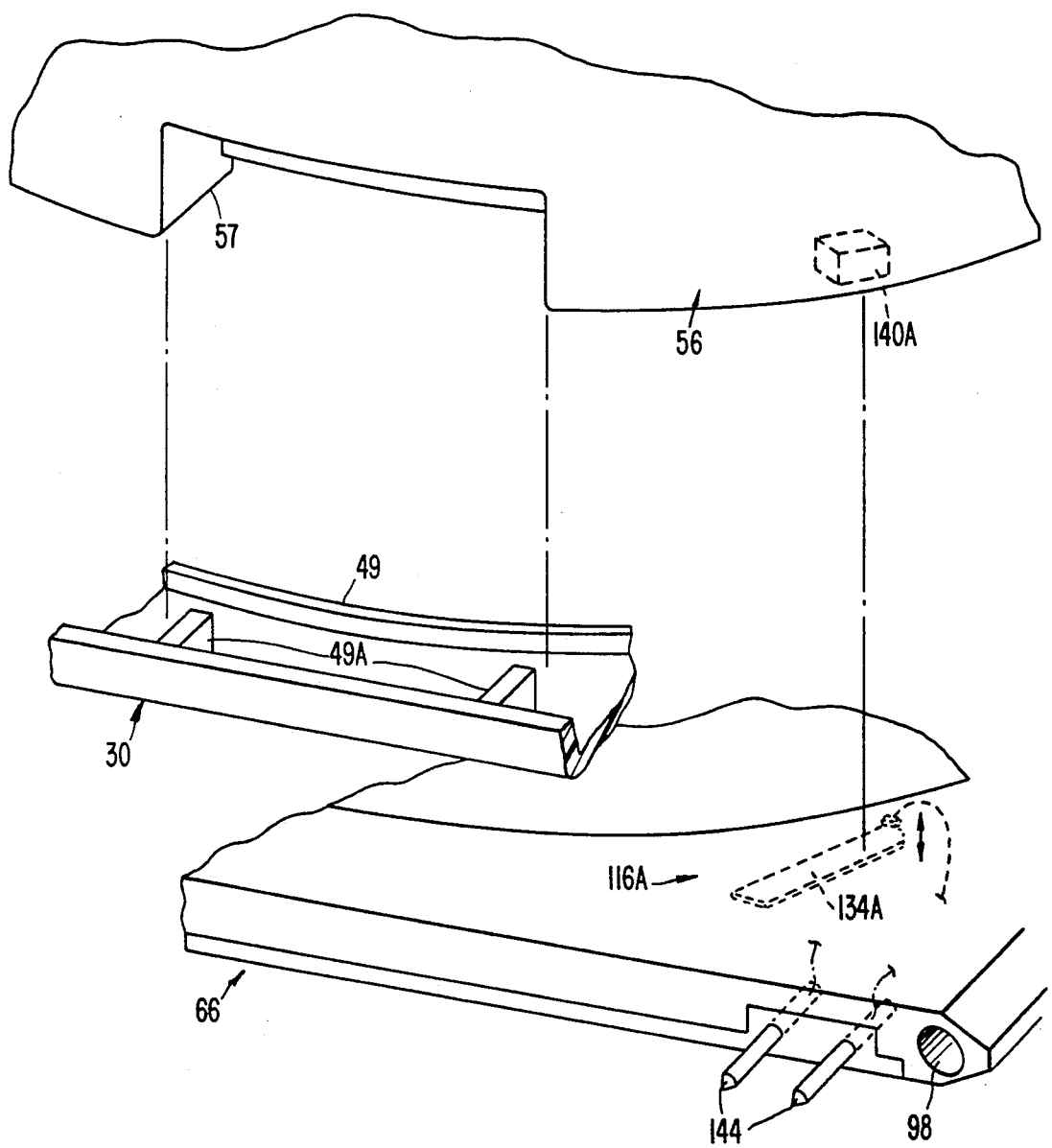
FIG. 19 is a partial exploded perspective view of a heater module, illustrating an alternate switch mechanism.

FIG. 19 illustrates an alternate embodiment of a switch mechanism 116A in which pivotable housing 130, magnet 132 and mercury switch 134 is replaced by a reed switch 134A. Magnetic ring 140 in cover 56 is replaced by a magnet 140A located in a small area along the base of cover 56. In order to properly align magnet 140A with reed switch 134A, a projection 49A is formed adjacent rim 49 on tray 30 and cooperates with a mating recess 57 formed in the interior surface of cover 56. This embodiment of switch mechanism and activating mechanism is a secondary embodiment and should be used only in environments where persons or patients with heart pacemakers are not present, since magnet 140A within cover 56 could interfere with the operation of the pacemakers.

Figure 22:
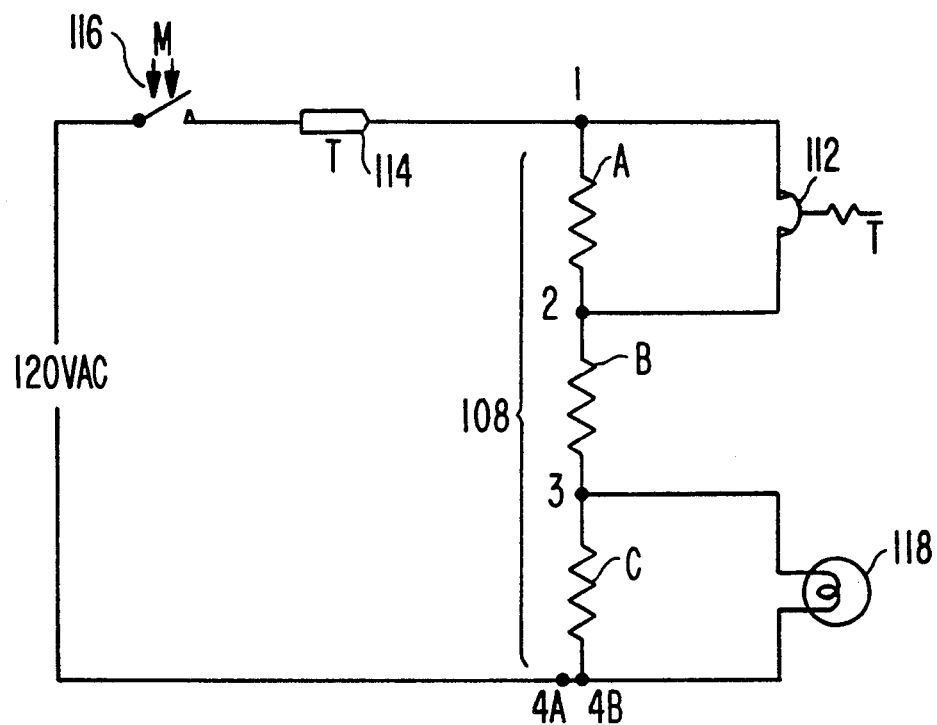
FIG. 22 is circuit diagram of one embodiment of a two-stage heater and heater control.

FIG. 20 illustrates the resistance pattern of heating element 108 of heater assembly 64, and FIG. 22 is a circuit diagram illustrating the manner in which power is supplied through heating element 108 to accomplish two-stage heating. Two-stage heating refers to the fact that in one stage the heater operates at a high power level and in another stage operates at a lower power level. The resistance pattern shown in FIG. 20 has a generally circular perimeter and is sized and arranged to cover substantially all of the bottom surface of heater plate 102.

As seen in FIG. 22, power is supplied to resistive elements A, B and C of heating element 108 when mercury switch 116 is closed. When thermostat 112 is open, current passes through all 3 resistive elements A, B and C and provides heat at a first power level. However, when thermostat 112 is closed, current is shunted past resistive element A and only passes through resistive elements B and C, C being a low voltage indicator light circuit. In this state, heat is supplied at a higher power level since the current passes through a lower resistance (B+C). Thus, during a rethermalization time period (the time period during which timer 33 supplies electrical power), power is always supplied to the food being rethermalized.

Details of the rethermalization will be discussed in greater detail in the discussion of the rethermalization method. However briefly, when food to be rethermalized is in its cold state and power is initially supplied to heater element 108, thermostat 112 is in its closed state so that heat is initially supplied at high power through resistive elements B and C. When the thermostat reaches its upper limit, it opens, so that current flows through all three resistive elements A, B and C at lower power. Thereafter, when the thermostat reaches its lower temperature limit it again closes to short current from resistive element A, and again supply heat at the high power level. Thus, throughout the rethermalization period heat is actively supplied to the food being rethermalized, but at varying power levels.

Figure 21:
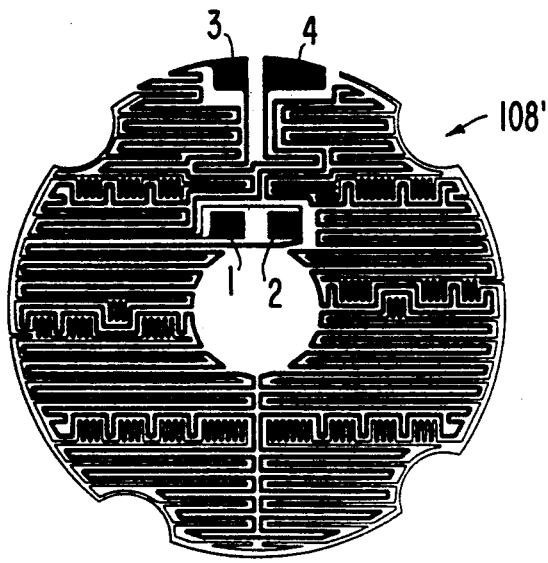
FIG. 21 is a diagrammatic view of the resistance pattern of another heater element.

As seen in FIG. 20, the higher resistance of resistive element A is accomplished by a plurality of parallel resistance elements connected at connection points 1 and 2, which are also shown in FIG. 22. In FIG. 21, which illustrates an alternate heating element 108 for use in the smaller soup heater module 66, the higher resistance of resistive element A is accomplished by using a smaller resistance element connected at connection points 1 and 2.

Figure 23:
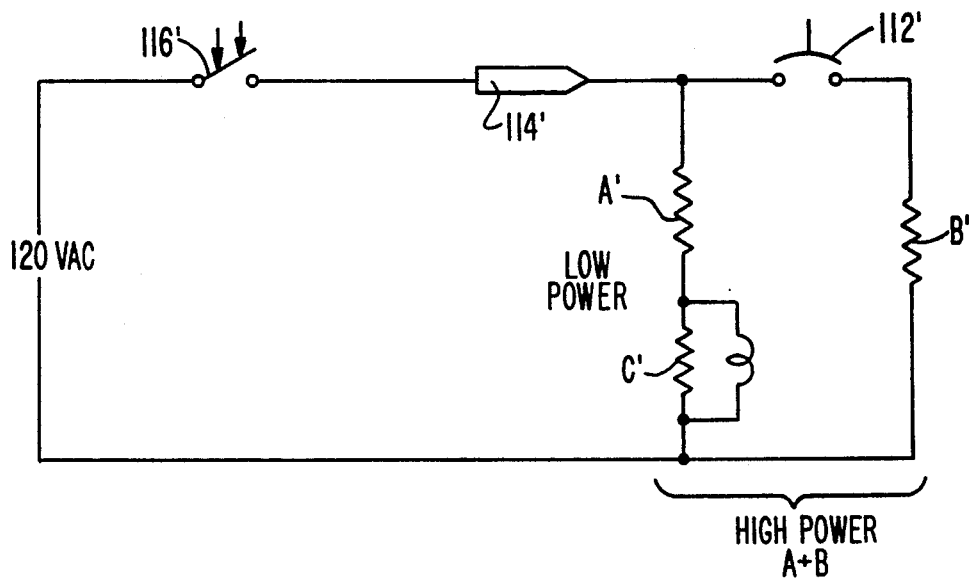
FIG. 23 is a circuit diagram of another embodiment of a two-stage heater and heater control.

FIG. 23 illustrates an alternate embodiment of heater element and control circuit arrangement which also accomplishes two-stage heating. In this embodiment, a first resistive heating element A' is connected in parallel to a second resistive heating element B'. Thermostat 112' controls the passage of current through elements A' and B' so that current passes through both elements in the high power mode of operation and through only element A' in the low power mode of operation. The resistance of element B' is preferably higher than the resistance of element A' so that in the low power mode of operation, the power is proportional relatively low, e.g. 25% of the total power when current passes through both elements A' and B'. Element C' can also be included for an indicator light.

Figure 24:
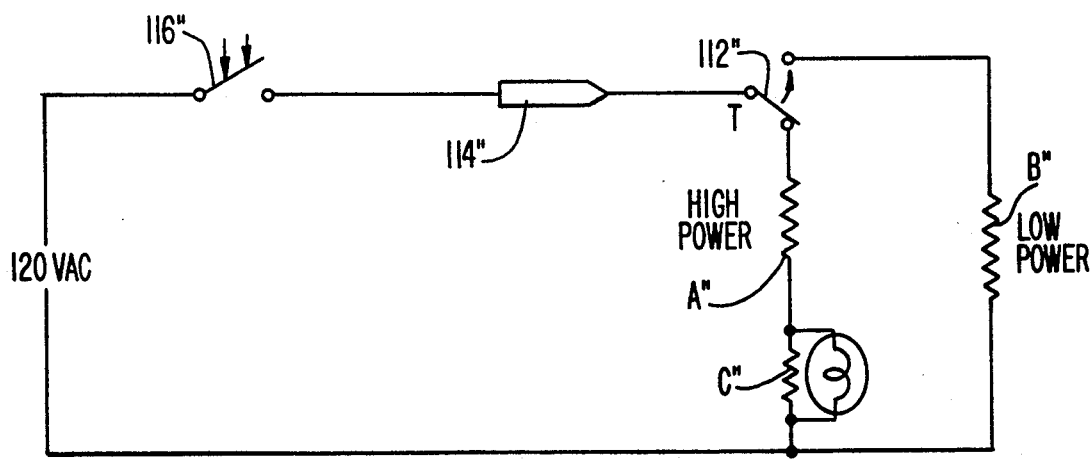
FIG. 24 is a circuit diagram of a further embodiment of a two-stage heater and heater control.

FIG. 24 illustrates another embodiment of heater element and control circuit arrangement which also accomplishes two-stage heating. In this embodiment, a first resistive heating element A" is also connected in parallel to a second resistive heating element B". However, thermostat 112" alternately supplies current to elements A" and B". The resistance of elements A" and B" is selected so that when current passes through element A" the heater operates at a high power level, and when current passes through element B" the heater operates at a lower power level. Element C" can also be included for an indicator light.

Rethermalization Method

Food service system 10, and in particular the two stage heating elements 108, 108' are particularly useful in a method of rethermalizing chilled, precooked food. The food is stored at the plurality of shelf locations within food service cart 12. Within cart 12, a preselected amount of food to be heated is supported adjacent each individual heater 64, 66. Generally, the total food portion for an entree can vary from 3–14 ounces, with the entree including one, two or three different foods. Similarly, the food to be heated by the soup heater element can vary from 3 to 6 ounces of soup, cereal, hot desserts, rolls or other liquids. The use of the two-stage heater in accordance with the present invention is particularly advantageous for rethermalizing entrees, and more particularly entrees which vary in their range of heat requirements. Entree foods generally include meat, fish, poultry, casseroles, starches and vegetables.

The two-stage heater applies heat to the food over a predetermined time period as set by timer 33. For example, the predetermined time period can range from 30–45 minutes, with 36 minutes being the preferred time. The heat is supplied by the heater in a thermostatically controlled manner as follows:

1) Heat is initially supplied from the heater at a high power level from the beginning of the predetermined time period;

2) The heat from the heater is reduced to a lower power level, lower than the higher power level, when an upper temperature of a temperature range of the thermostatic control is reached;

3) The heater operates at the low power level until a lower temperature of the temperature range is reached, and then increased to a higher power level above a low power level;

4) The heat from the heater is reduced to a low power level, lower than the higher power level, when the upper temperature of the temperature range is reached; and steps 3 and 4 are cyclically performed over the predetermined time period to continuously supply heat from the heater to the food during the predetermined time period.

Turning to FIG. 25, the two-stage application of heat in a rethermalization method in accordance with the present invention is compared to the application of heat in a prior art one-stage rethermalization method. In this prior art method heat is supplied by a single power heater which is cyclically turned on and off over the predetermined rethermalization time period. The graph is a theoretical graph and assumes that: (1) the total power of the prior art heater is the same as the high power level of the heater used in the present method; (2) all heaters operate between the same thermostat limits; and (3) the same food portion, an average entree portion, is being heated. The graph illustrates the temperature sensed by a thermostat coupled to the bottom of the heater plate.

As seen in the graph, both systems initially supply heat to the system at the same rate. After the upper temperature of the thermostatic temperature range is reached, the prior art system completely shuts off its single power heater, while the present system continues to apply heat through a low power heater. Thus, as seen in the graph, the temperature sensed by the thermostat decreases more rapidly in the prior art system than the temperature sensed in the present system. As a result, over a typical rethermalization time period, the prior art system must cycle its heater on more frequently than the high power heater of the present system is cycled on. The chances of scorching of food being rethermalized occurs during the temperature peaks, so that there are more opportunities to scorch the food in the prior art system. This scorching danger is actually greater in typical prior art systems which operate at higher temperature ranges than illustrated in the theoretical graph shown in FIG. 25. For example, as will be discussed hereinafter, the method of the present invention operates the heaters within a thermostatic temperature range between 220° F. and 235° F.±5° F., whereas a typical prior art heater operating over the same predetermined time period would operate between 245° F. and 270° F. Prior art systems, which rethermalize in even shorter time periods, operate at even higher thermostatic ranges, e.g. 350° F. to 400° F.

The present heating method also is directed to the manner of refining or adapting the two-stage heating method to a broad range of food types to be rethermalized. In order to accomplish this objective, the qualities of the foods, which determine the degree of heating the foods require, had to be classified or organized. The following chart A, lists the various food qualities or parameters which render the foods difficult or easy to heat, i.e. foods having either a high heat energy requirement or a low heat energy requirement.

As seen in Chart A, the food qualities which would determine whether a particular food is difficult or easy to heat include food density, portion size, configuration, moisture content, specific heat, and fragility. The variance of the supply voltage also effects the ability of the heater to heat the food.

Food density refers to mass per unit volume of the food, with the higher density food being more difficult to heat than the lower density foods. Larger portions of food, for example six ounces or more, are more difficult to heat than smaller portions of food, for example 1-½ to 3 ounces. The configuration of the food, in particular, the amount of surface area of the food which contacts the heating plate determines the ease with which a food can be heated. Flat food with relatively large surface area in contact with the heating plate is much easier to heat than unflat food which has very low surface contact with the heating plate. Moisture content also affects the ease with which the food can be heated, with the higher moisture content food, e.g. 70–75 percent liquid being easier to heat due to steaming than the foods with less moisture content, e.g. 38–75 percent liquid content. Specific heat also is a contributing factor to whether the food is difficult or easy to heat with foods of high specific heat, e.g. 0.85 to 0.95, being generally more difficult to heat than foods with low specific heat, e.g. 0.65 to 0.80. Fragility of food refers to whether a particular food can sustain its integrity and quality, e.g. not dry out or lose its color or texture, when it undergoes heating. Foods such as meatloaf, casseroles, lasagna and salisbury steaks are relatively sturdy and thus can undergo high energy heating, while such foods as poached eggs, omelets, rice, baked fish, pancakes and rare steaks are fragile and cannot undergo high intensity heating.

To arrive at the power settings and thermostat operating range to be used in the two-stage heating rethermalization method, extremes of foods with high energy heating requirements and foods with low energy heating requirements were first tested. Test examples are shown in the last column of Chart A. A preferred technique for arriving at the low power and high power settings was first to determine an amount of low power which could rethermalize low energy requirement foods, e.g. 2 ounces of peas or 2 stacked pancakes by raising their temperature from below 40° F. to approximately 140°. The low heat energy requirement food was not brought to the typical rethermalization temperature range of 175° F. to 210° F. with only the lower power heater, since the final heater would utilize the two-stage heater and, therefore, would result in an additional boosting of power over and above the use of only the low power heater.

Foods with high energy heat requirement for example, a 4 to 6 ounce salisbury steak with 4 ounces of mashed potatoes and 4 ounces of broccoli spears were thereafter tested in the following manner: The selected low power heater was run continuously and additional power was supplied by a secondary heater at progressively higher power until the high energy heat requirement food was adequately rethermalized from below 40° F. to above 165° F. The intermittent application of the additional power was controlled between predetermined thermostatic settings. Once a high power or additional power setting was determined, the combinations of low power and high power settings was tested on low heat energy requirement food to determine if the food could be adequately heated or if its quality was destroyed. Adjustments were made up and down the power scale on both the low power heater and high power heater with the power to the high power heater being decreased when the power to the low power heater was increased. Through this process, it was eventually determined that optimum power settings for the high and low power heaters was a low power setting slightly lower than the initial setting of the low power heater for low energy requirement foods and a slightly increased power setting for the high power heater over the initial power supplied to the high heat energy requirement foods.

This test procedure was used at progressively lower thermostat range settings. That is, initial testing occurred at a typical higher prior art thermostatic range, e.g. between 245° F. to 280° F. However, it was eventually determined that a thermostatic temperature range between 215° F. and 240° F., preferably between 220° F. and 235° F., and power supplied at 41 watts at the low power setting and 156 watts at the high power setting accomplished the objectives of satisfactory rethermalizing entree food or both high and low energy requirements, as well as rethermalizing mixtures of low and high energy requirement of food such as shown in Chart A. Suitable power ranges for the entree heater should be approximately 35 to 45 watts for low power and 150 to 160 watts for high power.

In order to establish the thermostat and power settings for small heater module 66, a similar procedure was followed. As a result, it was determined that a thermostat range between 240° and 275° worked satisfactorily with power supplied at 10 watts at the low power setting and 46 watts at the high power setting. With these power and thermostat settings, it was found that a variety of difficult to heat liquids, as well as delicate, light weight rolls could be heated. When rolls are to be heated, they can be supported on small dishes or a disposable plate or lid rather than on bowls.

In order to establish the above parameters of this method of rethermalization, i.e. the range of foods to be rethermalized and the thermostat and power settings, other system constants had to be set. For example, the thickness and size of the heater plate had to be held constant throughout the testing. It was determined that the system worked well with a nickel plated aluminum heating plate having a thickness of ⅛ of an inch and a diameter of approximately 7 inches.

The size, shape and configuration of the dish also had to be held constant. It was found that a highly conductive ceramic dish with an alumina additive to increase its convectiveness was suitable for the rethermalization process. The preferred dish has a diameter of approximately 7¾" and a thickness of approximately ¼ of an inch. In order to ensure proper heat conduction from the aluminum heater plate to the dish, the dish should be extremely flat with very little concavity and no convex points.

The size, shape and configuration of the bowl for the small heater also was held constant during testing. A round four inch bowl, with an eight fluid ounce capacity, and made of a high heat resistant injection molded plastic was found to be suitable. A bowl with a bottom thickness of approximately a forty-thousandths of an inch had the appropriate thermal conductivity. The bottom of the bowl also was kept very flat and a thin high heat resistant plastic lid was placed on top of the bowls.

Numerous characteristics and advantages of the invention have been described in detail in the foregoing description with reference to the accompanying drawings. However, the disclosure is illustrative only and the invention is not limited to the precise illustrated embodiments. Various changes and modifications may be affected therein by persons skilled in the art without departing from the scope or spirit of the invention.

Chart A

| Heat Requirement | Food Density | Size of Portion | Configuration | Moisture Content | Specific Heat | Fragility | Voltage | Tested Examples |
|---|---|---|---|---|---|---|---|---|
| High | (High) meat loaf lasagna potatoes mac & cheese chicken oatmeal | Large (6 oz or more) total plate weight 10-12 oz. bone-in chkn. lasagna | Unflat/low Surface Area broccoli brussel spts bk. potato mac. & chs. | Low (38-75%) ham bk. chkn. | High (.85-.95) apples potatoes | Sturdy meatloaf casseroles lasagna sals. stk. | Low 108 | 4-6 oz salisbury steaks, 4 oz mashed potato, 4 oz. broc sprs. chicken thigh, 4 oz (bone-in), 3 oz brussel sprouts, 4-5 oz baked potato 7 oz sal. stk. + 6 oz mashed pot. 2 oz carrots 4-6 oz oatmeal 4-6 oz broth |
| Low | (Low) rice omelette pancakes bread, rolls peas corn | Small (1.5-3 oz.) total plate weight 3-4 oz. | Flat/Large Surface Area sliced meats casseroles steaks mash. pot. | High (75-95%) spinach casseroles gravies beef broth | Low (.65-.80) ham chicken sausage beef | Fragile poached eggs omelette rice rst. beef baked fish pancakes stk (rare) | High 125 | pched egg, toast one chs. omlte 2 oz. peas or corn or rice 2 pancakes (stacked) (stacked) rolls |
| Mixed | | | | | | | | 8 oz. Lasagna (tall) + 1.5 oz. green peas whole baked pot. + 2 oz. sliced roast beef 6 oz. meat loaf, 2 oz. rice 4 oz. rice, 6 oz glazed chicken (Oriental) 8 oz. mac & ch. 2.5 oz. broc. 6 oz. stuffed baked flounder + 2 oz. green peas |

What is claimed is:

1. A rethermalization system comprising:
   (a) a food service tray including a hot dish through-opening, said through-opening having a through-opening top edge and an inner surface;
   (b) a rethermalization cart including a cart frame, a plurality of heating pads supported within said cart frame, and a plurality of vertically spaced tray supports attached to said cart frame which supports said food service tray at a plurality of alternative vertically spaced shelf locations, and in a tray support position wherein said hot dish through-opening is disposed above one of said heating pads; and
   (c) a food service dish positionable in said hot dish through-opening of said food service tray, said food service dish including a bottom surface which allows heat transfer to occur from said heating pad to food in said food service dish with said tray in the tray support position; characterized in that:
   said food service dish includes an upwardly outwardly flaring side extending from said bottom surface, a generally vertical wall extending upwardly from said flaring side, and an upper lip projecting generally horizontal from said generally vertical wall;
   said food service dish is positionable in a heating position when said tray is in the support position, the heating position including said bottom surface thereof being supported by said heating pad such that said upper lip of said food service dish is slightly raised and out of contact from said through-opening top edge in order to reduce heat transfer between said food service dish and said food service tray; and
   said food service dish is positionable in a serving position when said tray is supported on a planar surface, the serving position including said food service dish being positioned relative to said through-opening such that said generally vertical wall is closely positioned horizontally adjacent to the inner surface of said through-opening with no intermediate member disposed therebetween in order to block excessive horizontal movement of said food service dish within said through-opening while the rethermalized food in said food service dish is being consumed.

2. The rethermalization system as recited in claim 1 wherein said food service dish is made as an integral one piece of ceramic material.

3. The rethermalization system as recited in claim 1 wherein said bottom surface and said upwardly outwardly flaring side of said food service dish are of a constant thickness.

4. The rethermalization system as recited in claim 1 wherein said upwardly outwardly flaring side has an outer surface which is frusto-conical.

5. The rethermalization system as recited in claim 1 wherein when in the serving position, said food service tray and said food service dish are both supported on the planar surface.

6. The rethermalization system as recited in claim 1 wherein said upper lip is continuous about the periphery of said food service dish.

7. The rethermalization system as recited in claim 1 wherein said food service dish is circular.

8. The rethermalization system as recited in claim 1 wherein said food service dish defines a first food service dish, said through-opening defines a first through-opening, said through-opening top edge defines a first through-opening top edge, said food service tray includes a second through-opening having a second through-opening top edge and a second inner surface, and further comprising a second food service dish positionable in said second through-opening.

9. The rethermalization system as recited in claim 8 wherein said second food service dish includes an upwardly outwardly flaring side extending from said bottom surface, a generally vertical wall extending upwardly from said flaring side, and an upper lip projecting generally horizontal from said generally vertical wall;

said second food service dish is positionable in a heating position when said tray is in the support position, the heating position including said bottom surface of said second food service dish being supported by one said heating pad such that said upper lip of said second food service dish is slightly raised and out of contact from said second through-opening top edge in order to reduce heat transfer between said second food service dish and said food service tray; and said second food service dish is positionable in a serving position when said tray is supported on a planar surface, the serving position including said second food service dish being positioned relative to said second through-opening such that said generally vertical wall of said second food service dish is closely positioned horizontally adjacent to the inner surface of said second through-opening in order to block excessive horizontal movement of said second food service dish within said through-opening while the rethermalized food in said second food service dish is being consumed.

10. The rethermalization system as recited in claim 1 wherein said food service dish is constructed of a high heat resistant injection molded plastic.

11. The rethermalization system as recited in claim 1 wherein said food service dish is constructed of a highly conductive ceramic material.

12. The rethermalization system as recited in claim 11 wherein said ceramic material includes an alumina additive to increase its convectiveness.

13. The rethermalization system as recited in claim 1 wherein said bottom surface of said food service dish is flat in order to ensure proper heat conduction from said heating pad to food in said food service dish when said food service dish is in the heating position.

14. The rethermalization system as recited in claim 1 wherein said food service dish is generally flat with little concavity.

15. A rethermalization system comprising:

(a) a food service tray including a hot dish through-opening, said through-opening having a through-opening top edge and an inner surface;

(b) a rethermalization cart including a cart frame, a plurality of heating pads supported within said cart frame, and a plurality of vertically spaced tray supports attached to said cart frame which supports said food service tray at a plurality of alternative vertically spaced shelf locations, and in a tray support position wherein said hot dish through-opening is disposed above one of said heating pads; and (c) a food service dish positionable in said hot dish through-opening of said food service tray, said food service dish including a bottom surface which allows heat transfer to occur from said heating pad to food in said food service dish with said tray in the tray support position; characterized in that:

said food service dish includes an upwardly outwardly flaring side extending from said bottom surface, a generally vertical wall extending upwardly from said flaring side, and an upper lip projecting generally horizontal from said generally vertical wall;

said food service dish is positionable in a heating position when said tray is in the support position, the heating position including said bottom surface thereof being supported by said heating pad such that said upper lip of said food service dish is slightly raised and out of contact with said through-opening top edge in order to reduce heat transfer between said food service dish and said food service tray;

said food service dish is positionable in a serving position when said tray is supported on a planar surface, the serving position including said food service dish being positioned relative to said through-opening such that said generally vertical wall is closely positioned horizontally adjacent to said inner surface of said through-opening in order to block excessive horizontal movement of said food service dish within said through-opening while the rethermalized food in said food service dish is being consumed, and said food service dish is positionable in a carrying position when said tray is being carried generally by edges thereof with said food service dish being supported by said upper lip being supported directly on and by said through-opening top edge.

16. A rethermalization system comprising:

a rethermalization cart including a cart frame;

at least one tray support and at least one heating pad, said tray support and said pad supported by said cart frame;

at least one food service tray including at least one opening disposed therethrough, said opening having an inner surface disposed at a predetermined first level, said tray removably disposable within said cart and supported by said tray support with said opening disposed above said heating pad;

at least one food service dish having a bottom surface and an outer wall, said outer wall defined by a first surface flared outwardly from said bottom surface and extending upwardly to a second level, a substantially vertical second surface extending upwardly from approximately the second level, said second surface disposed outwardly of said first surface, and a lip disposed above said second surface and extending outwardly, said dish removably disposable within said opening, wherein, when said dish is disposed within said opening said second surface is disposed closely adjacent said inner surface of said opening in the horizontal direction with the second level below the first level to prevent excessive movement in the horizontal direction, and when said dish is disposed within said opening while said tray is disposed within said cart said dish is supported by said heating pad with said lip disposed above and out of contact with said tray.

17. The system recited in claim 16, said dish outer wall including a stepped portion extending upwardly from approximately the second level, said stepped portion including said substantially vertical second surface.

18. The system recited in claim 17, said tray including an upwardly extending peripheral rim disposed about the periphery of said opening, said rim including said inner surface of said opening, wherein, when said dish is disposed in said opening, at least a portion of said stepped portion is disposed below at least a portion of said rim and said lip is disposed over said rim.

19. The system recited in claim 16, said tray including an upwardly extending peripheral rim disposed about the periphery of said opening, said rim including said inner surface of said opening, wherein, when said dish is disposed in said opening, at least a portion of said second surface is disposed below at least a portion of said rim and said lip is disposed over said rim.

20. The system recited in claim 16, said at least one heating pad comprising a plurality of heating pads, said at least one opening comprising a plurality of openings, each opening disposed above one said heating pad, said at least one dish comprising a plurality of dishes, one said dish disposable through each said opening and supported by one said heating pad.

21. The system recited in claim 20, said at least one tray support comprising a plurality of tray supports, each said tray support supported by said cart frame at a different vertical location, said at least one tray comprising a plurality of trays.

22. The system recited in claim 16, said at least one tray support comprising a plurality of tray supports, each said tray support supported by said cart frame at a different vertical location, said at least one tray comprising a plurality of trays.

23. The system recited in claim 14, said opening being substantially circular and having a first diameter, said second surface being substantially circular so as to give said dish a substantially constant diameter at said second surface, the constant diameter being less than the first diameter.

* * * * *